US011570167B1

(12) United States Patent
Eshun et al.

(10) Patent No.: US 11,570,167 B1
(45) Date of Patent: Jan. 31, 2023

(54) METHOD AND APPARATUS FOR ONE OR MORE CERTIFIED APPROVAL SERVICES

(71) Applicant: CHIPIWORKS COMPANY, Piedmont, CA (US)

(72) Inventors: Kobi Eshun, Piedmont, CA (US); Karim Tahawi, Piedmont, CA (US)

(73) Assignee: CHIPIWORKS COMPANY, Piedmont, CA (US)

( * ) Notice: Subject to any disclaimer, the term of this patent is extended or adjusted under 35 U.S.C. 154(b) by 0 days.

(21) Appl. No.: 17/513,201

(22) Filed: Oct. 28, 2021

Related U.S. Application Data

(62) Division of application No. 16/121,550, filed on Sep. 4, 2018, now Pat. No. 11,153,298.

(60) Provisional application No. 62/726,420, filed on Sep. 3, 2018, provisional application No. 62/553,838, filed on Sep. 2, 2017.

(51) Int. Cl.
*H04L 9/40* (2022.01)

(52) U.S. Cl.
CPC .................. *H04L 63/0823* (2013.01)

(58) Field of Classification Search
CPC .................................................. H04L 63/0823
See application file for complete search history.

(56) References Cited

U.S. PATENT DOCUMENTS

| 9,807,073 | B1 * | 10/2017 | Miller | G06F 21/6218 |
| 2016/0072808 | A1 * | 3/2016 | David | H04L 63/126 |
| | | | | 713/158 |
| 2017/0048240 | A1 * | 2/2017 | Chang | G06F 21/32 |
| 2018/0255456 | A1 * | 9/2018 | Yin | H04W 12/041 |
| 2018/0332016 | A1 * | 11/2018 | Pandey | H04L 63/0428 |

* cited by examiner

Primary Examiner — Vu V Tran
(74) Attorney, Agent, or Firm — Earle Jennings

(57) ABSTRACT

Apparatus and methods pertaining to a Certified Approval Service (CAS) are disclosed and enabled. The apparatus may include a Personal Computing Device (PCD) implementing a CAS Device to interact with an end user and a server implementing a CAS provider. The various embodiments operate without the end user and the CAS provider to engage in an authenticated login session between themselves.

14 Claims, 23 Drawing Sheets

End User

End User

End User

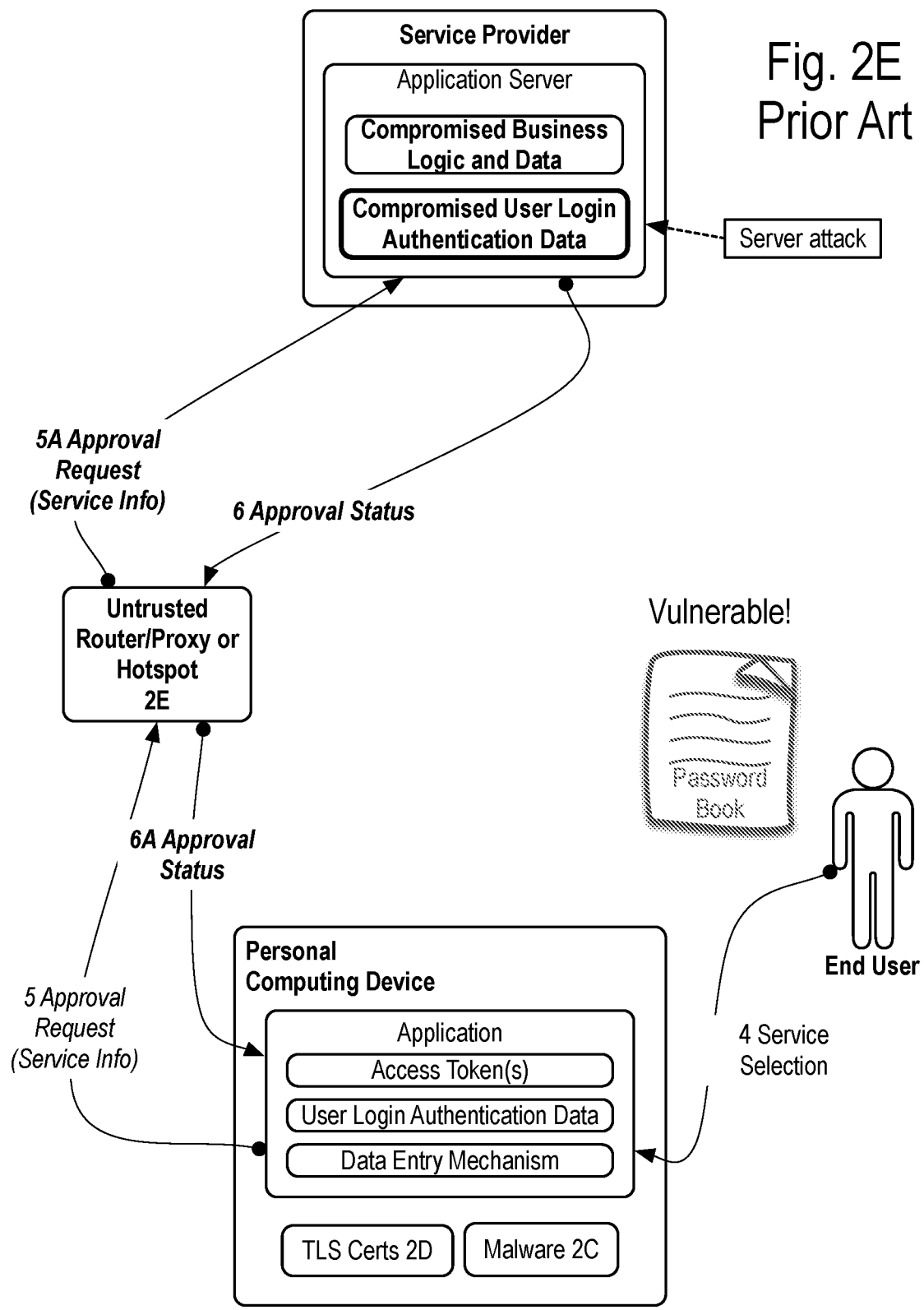

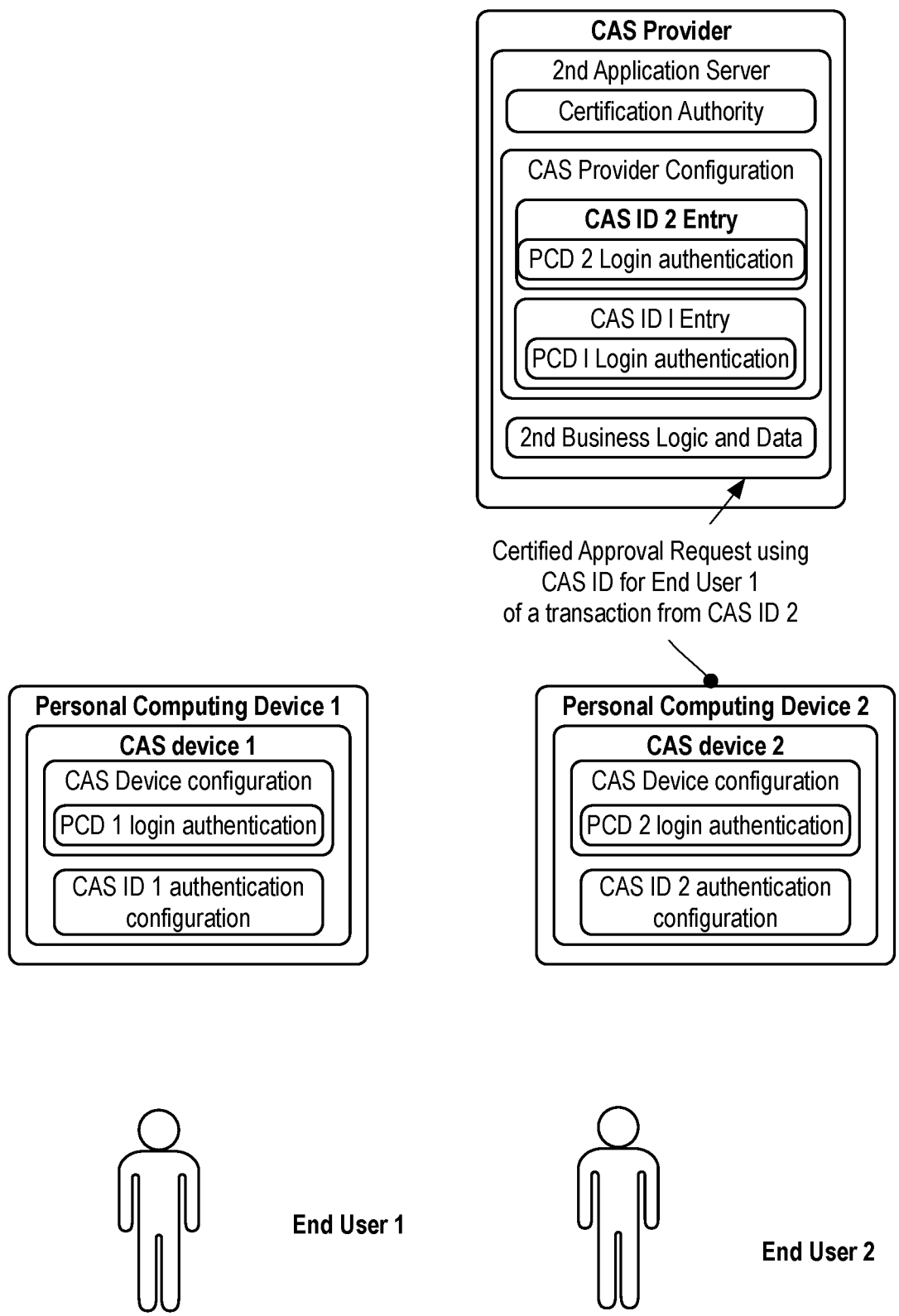

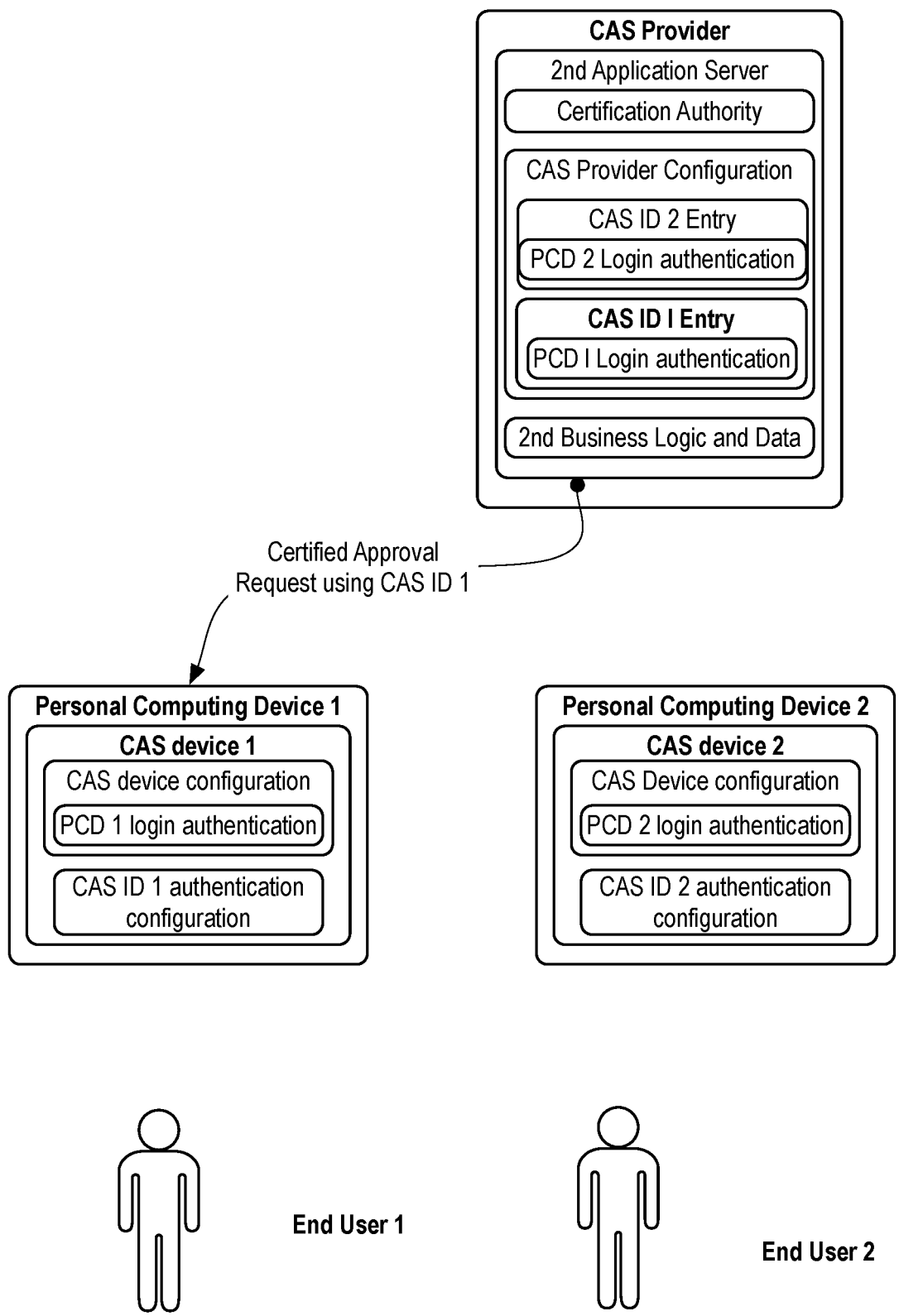

METHOD AND APPARATUS FOR ONE OR MORE CERTIFIED APPROVAL SERVICES

TECHNICAL FIELD

This application discloses and claims one or more embodiments of a Certified Approval Service (CAS), which for many purposes can replace login-based approval mechanisms while providing convenient security. The context of this replacement is broad, including, but not limited to mercantile contracts, responsibility transactions, critical transfer transactions, as well as implementing several approval protocols. CAS provides solution(s) to one or more of the following technical problems: password management, user authentication data theft, additional verification, point-of-sale authorization, enterprise computing infrastructure access control, spontaneous purchase or service agreement, controlling access to sensitive da, Internet of Things (IoT) device management, control of (web) content access, efficient delivery and approval of relevant service offers. All of these are disclosed and claimed herein or in subsequent applications claiming priority to this application and possibly its priority documents.

BACKGROUND

Login-Based Approval, prior art method used by service providers to obtain certified approval from an End User is based on the authenticated login session, which is shown through FIG. 1A to FIG. 2E. In this architecture, there are:
  A Service Provider, which may include, but is not limited to, a business entity which may or may not be human, directing an Application Server to provide goods and/or services; and which directs an Application Server to maintain and refer to a da store of access credentials for the purpose of obtaining approval to deliver those goods and services. Note that the Service Provider's directions to the Application Server may be encoded in a first business logic, and combined with configuration and authentication da, and may possibly involve running on one or more additional programs on at least one computer, as shown in FIG. 1A to FIG. 2E.
  A Service Application, software used by an End User via a personal computing device, that establishes an authenticated login session with the Application Server as directed by the Service Provider. Once the authenticated session has been established, the Application facilitates selection of goods and services, and also approving related transactions, as shown in FIG. 1A to FIG. 2E.
  An End User, who establishes an account with each Service Provider of interest, maintaining access credentials for each one. Note: the End User may be a human, or some form of automaton directed by a user, as shown in FIG. 1A to FIG. 2E.

When the End User logs into a service with their password, the Service Provider has some level of confidence that the user is in fact who they claim to be. Additional confidence is achieved by the Service Provider through various schemes: insisting on stronger passwords; challenging the user for personal details; asking for a single-use verification code sent to the user via an independent channel; etc.
  When the Service Provider has achieved the desired level of confidence that the user establishing the session is authentic, the session is considered to be (sufficiently) authenticated, and any service authorizations issued via that session are, by extension, deemed to be similarly authentic.
The Service Provider can refresh or increase the level of confidence associated with an active session, and issue further authentication challenges to the user. For example, a higher level of confidence may be required for some class of service authorizations presented by the user during a session.
The typical procedure for providing certified approval is shown in FIG. 1A to FIG. 2E, and was referred to in FIG. 1 entitled "Login-Based Approval Example Operational Flow" in the priority filing document of 2017. The numbers in the discussion below correspond to numbered line labels in the figure.
FIG. 1A shows the End User initiates a login (1) to the service (enters a password, answers a personal question correctly, enters a single-use verification PIN, etc.) via the Application.
The Application establishes an authenticated login session (2) to the Service Provider's Application Server, often starting by sending the user name and password as shown in FIG. 1B. It may receive an access token (3) to facilitate restoring the authenticated login session at a later time as shown in FIG. 1C.
The Application Server frequently presents the End User with a form (3) via the Application. The End User fills in fields (4) confirming that they want the product or service; perhaps clicks on a mandatory checkbox to accept the terms of service; and then submits the form with one or more service selection(s) as shown in FIG. 1D.
The Application delivers the form as an approval request (5) to the Application Server for approval as shown in FIG. 1E.
The Application Server receives, processes, and archives the completed form, and then responds with an approval status (6) as shown in FIG. 1F.
This Login-Based Approval pattern, as shown in FIG. 1A to FIG. 1F, is deployed for practically all services today. It strongly binds approvals to identity in two key ways. First, the End User must be logged in to the service in order to approve anything. Second, only that End User is allowed to approve operations against the account. This greatly increases the technical complexity of implementing secure, login-based approval flows involving multiple End Users, and limits the flexibility and convenience of services which can be economically provided.
Authentication Da Vulnerability is shown in FIG. 2A to FIG. 2E, includes but is not limited to the following: In addition to being inflexible, the Login-Based Approval architecture presents many opportunities for attackers to surreptitiously obtain sensitive consumer da for fraudulent or otherwise unsanctioned use. FIG. 2A to FIG. 2E are a clarification of FIG. 2 of the priority provisional patent application, entitled "Login-Based Approval Authentication Da Theft Opportunities". In further detail:
  FIG. 2A shows an example of End Users saving their passwords in notebooks, on sticky-notes, or in plain-text files or spreadsheets which are represented by the icon labeled "Password Book".
  FIG. 2B shows that these storage mechanisms are all vulnerable to loss and theft; worse, they may be surreptitiously scanned and exploited before their owner realizes they've been compromised.

FIG. 2C shows that personal computing devices (desktop computers, tablets, smartphones, etc.) are susceptible to malware (2B) that can secretly log and exfiltrate keystrokes and access tokens. It is also possible for malware (2B) to compromise the TLS Certificate Store (2C) on a personal computing device, making the device vulnerable to a Man-In-The-Middle attack while it attempts to communicate securely with service providers.

FIG. 2D shows attackers snooping on local-area network (LAN) traffic (2D) to detect and log non-encrypted authentication da.

In some situations, as unscrupulous WiFi hotspot operator could trick an End User into compromising the TLS Certificate Store (2C) on their computing device as a precondition for web access via their hotspot, which constitutes an Untrusted Router and/or Untrusted Proxy Server (2E). Then, every time the End User connects to that hotspot (2E), their personal computing device would be vulnerable to a Man-In-The-Middle attack, making their encrypted da plainly visible to the WiFi hotspot operator.

FIG. 2E is based upon a common practice at the time of filing this patent application: Service providers often accumulate troves of sensitive da on their application servers about their End Users including passwords, credit card information, answers to private questions, and so on. These troves of da (2F) are a rich target for data thieves, who routinely breach the service providers' defenses. Those da are also vulnerable to seizure by government agents.

These vulnerabilities are well known, as are best practices for minimizing their impact. However, the remedies are so complex and inconvenient, that the vast majority of End Users have little hope of implementing them successfully or consistently. Even service providers (large and small) are not consistently able to implement the recommended practices for safeguarding the sensitive da they accumulate. Here is a small sample of the real-world consequences of this design failure:

DropBox password breach in 2012, exposing 68 million user passwords, out of approximate user base of 100 Million.

Yahoo! password breach late 2014, compromising 500 million user accounts.

During 2016 US Presidential election campaign, a high-profile political operative fell for a "phishing" attack, causing him to reveal his email password to authentication da thieves.

Late 2013, approximately 100,000 IoT devices, deployed with default administrative passwords, were compromised and harnessed to emit a wave of malicious SPAM emails.

Attacks and exploits of these kinds are now common-place, and have already become a threat to national security to many nations throughout the world.

SUMMARY OF THE INVENTION

This document introduces a convenient Certified Approval Service (CAS) in terms of several embodiments. These embodiments may implement an operational flow of various computing devices configured to play a part in these operational flows. They offer a different approach to securely approving transactions without the need for end users and service providers to communicate within authenticated login-based sessions. They enable convenient approvals for most, if not all, of today's services requiring passwords and/or other authentication da.

FIG. 3A to FIG. 3C shows an end user requesting and receiving access to a CAS provider. An end user requests a CAS Identification (ID), by interacting with one or more of their personal computing devices as shown in FIG. 3A. The personal computing device communicates the request to a CAS provider implemented as an apparatus which can communicatively interact with the personal computing device (PCD). When this stage of the communicative interactions is completed, FIG. 3B shows the CAS Provider configuration includes a CAS ID entry, which further includes a PCD login authentication component. The CAS provider sends a CAS device configuration to the personal computing device, where it is received. The PCD is configured by the sent CAS device configuration to include a CAS device configuration further include a PCD login authentication. Upon completing the operations of FIG. 3B, the PCD becomes a CAS device able to interact with the CAS provider as shown in FIG. 3C. The CAS device and the CAS provider implement deep encryption and other security protocols, with no inconvenience to the end user. With these convenient and secure communications protocols in place, the CAS device receives a CAS ID authentication process configuration from the CAS provider. The received process configuration is installed and interacts with the end user to establish one or more authentic CAS ID interactions, which are defined in the CAS ID authentication configuration contained in the CAS device configure as shown in FIG. 3C. The end user of FIG. 3A to FIG. 3C is referred to as a first end user hereafter.

FIG. 4A to FIG. 4F show a basic approval method between two end users, each operating a separate personal computing device, which separately implement distinct CAS devices. Each CAS device securely communicates with the CAS provider, without inconvenience to either end user. The CAS provider includes a CAS provider configuration, which may maintain configuration da for many, if not all, associated CAS End User. These da include billing information, contact information, Personal Computing Device Login Authentication information, End User preferences, etc. The following is an example of the basic approval method:

A second end user requests an approval of the first end user for a transaction in FIG. 4A. The approval request is created by the second end user authentically interacting with a second CAS device.

A Certified Approval Request using the CAS ID 1 for the first End User of the transaction is sent by the second CAS device to the CAS provider in FIG. 4B. The communication is secured based upon the PCD 2 login authentications found in the CAS ID 2 entry of the CAS provider and found in the CAS device configuration of CAS device 2 contained in Personal Computing Device (PCD) 2.

The CAS provider repackages the approval request received from the second CAS device into a Certified Approval Request, using the security protocols configured into the communications between the CAS provider and CAS device 1, without any inconvenience to either end user as shown in FIG. 4C. The repackaging may include unpacking the received request based upon the CAS ID 2 entry to create an unpacked request. The CAS ID 1 entry may be used to respond to the unpacked request to generate the repackaged certified approval request sent to the PCD 1, in particular, to the CAS device. This communication is deeply secured by the PCD 1 login authentication of the CAS ID 1 entry of the CAS provider, and by the PCD 1 login authentication included in the CAS device configuration of PCD 1. This communication requires no interaction with the end users, instead it relies upon these login authentications. For example, these login authentications may include passwords of multiple kilobytes, possibly being uniquely generated for each message sent or received by the CAS provider.

The first end user receives the certified approval request presented by the first personal computing device in FIG. 4D. The first end user authentically communicates with the personal computing device in response to the certified approval request. This authentic communication is typically not over a wide-area network, it is between the end user and their personal computing device. Even if Bluetooth is involved with the authentic interactions, they may be heavily encrypted, and possibly further hidden from snooping, without any inconvenience to the end user.

Upon completing the presentation and authentic interaction of FIG. 4D, the CAS device 1 sends a certified response by the CAS ID 1 of the first end user to the approval request, as shown in FIG. 4E. The certified response is sent to the CAS provider as a very secure communication, again without any inconvenience to the end user.

The CAS provider receives the certified response and again repackages this message to create and send a CAS Certified Response for the CAS ID 1 (of the first end user) to the second CAS device as shown in FIG. 4E. This transmission is also separately, deeply, secured, but without any inconvenience to the end users.

FIG. 4G shows the second CAS device responding to the received CAS certified response, by presenting to the second, requesting, end user the response to the approval request. The second end user responds the response by executing the transaction, which creates the approved transaction.

The CAS ID may include, but is not limited to one or more of the following: a user name, a phone number, an email address, a registration number, a membership number, and/or an avatar name, as shown in FIG. 5A.

As used herein, transactions may include, but are not limited to, mercantile transactions, control transactions, access transactions, responsibility transactions and/or supervised transactions, as shown in FIG. 5B.

This document discloses not only the basic approval method shown in FIG. 3A to FIG. 4F, but also other approval methods summarized in FIG. 5C, and further shown in subsequent drawings. These approval methods include, but are not limited to, a third party approval method, a first responder approval method, a delegated approval method, an automated conditional approval method, a consensus approval method, and/or a supervised approval method. All of these approval methods are referred to as CAS approval methods, which may or may not be directly derived from the basic CAS approval method, depending upon the implementation derails, in particular, the configuration of the various computing devices involved in these various methods.

By way of example, a computing device and/or a server may include one or more instances of any combination of a computer, a finite state machine, an inference engine, a neural network, and a quantum computer, individually or collectively interacting with one or more communication networks. Any of these computing components may implement states as binary or non-binary value sets, which in the case of quantum computers, may or may not be reasonably finite. An example of an unreasonably finite value set is a quantum state roughly approximated by the position conditions of the particles involved in that quantum state.

As used herein, a computer includes at least one da processor and at least one instruction processor, wherein each of the da processors is instructed by an instruction generated by at least one of the instruction processors.

As used herein, a finite state machine includes at least one input, possibly one or more internal states, and at least one output. The input and the output may each have values, which may, or may not, be distinct in size, value, and affect. The value of an output may generated in response to at least one of the inputs and/or at least one value of at least one internal state. The internal state may change based upon a preceding value of the internal state and/or the value of one or more of the input(s), and/or the value of one or more of the outputs. The value of the outputs may change based upon the value of one or more of the inputs, the internal states and/or the previous values of one or more of the outputs. The internal state(s) may be generated by at least one logic circuit based upon logic gates, which may be standard Boolean algebra-based circuits or non-standard logic-based circuits implemented with any combination of photonic circuits, memristors, spin-based circuits, and/or molecular gates, to name some contemporary examples which have been experimentally confirmed as of the date of this document's filing.

An inference engine implements at least one inferential graph including at least one transition as an edge between a first node and a second node. The transition from the first node to the second node may result from the edge implementing a form of inference. The second node transitioning to the first node may implement the same or a different form of inference. An inference may implement an arithmetical and/or logical operation based upon at least part of the state of a node.

A quantum computer includes one or more quantum state, referred to as qubit(s), and employs at least one quantum effect, such as superposition and/or entanglement to alter at least part of the qubit(s).

A neural network includes models of neural states, called neurons, and connections between these neurons, which may model synapses and/or synaptic connections, possibly involving models of dendritic connections. While neural networks may model entities found in biological systems such as human beings, rodents, and/or other animals, in some situations they may result from mathematical models, such as evolutionary programs and/or systems, which may, or may not, involve fussy logic.

Any or all of the computers, inference engines, quantum computers, and neural networks may be implemented with any of the following: semiconductor fabrication process technologies, spintronics, molecular gates, piezoelectric materials, me-materials, ferrite technologies, and/or memristors. Adiabatic implementations may be built based upon any of these technologies to create near zero power dissipation circuitry.

A communications network refers to any combination of at least one Shannon network, an analog network, and/or at least one quantum network.

A Shannon network includes at least one channel operating in accord with Shannon-Harley Theorem. The theorem states the channel capacity C, the theoretical upper bound on the information rate of da that can be communicated at an arbitrarily low error rate using an average received signal power S through the channel subject to additive white Gaussian noise of power N.

Note that in determining the Shannon limit of the channel, the channel is considered as an analog channel, even though communications across the channel may employ one or more digital communication protocols. The channels may be based upon wires, optical fibers, water, air, deep space, and so on. Shannon networks account for almost all, if not all, of our contemporary communications technology in widespread use today.

An analog network includes at least one analog channel implemented to transfer at least one analog signal, often in the presence of noise. A digital network includes at least one digital channel implemented to transfer at least one digital signal, also often in the presence of noise. Digital signals are frequently encoded as one or more bits, whereas analog signals frequently range over a larger range of analog states, sometime forming a range of values which may be considered a continuum between one real number value and a second real number value, which may be represented as fixed point, floating point and/or posit numbers. To simplify this discussion, all digital networks and all analog networks are considered to be examples of Shannon networks.

A quantum network employs some form of quantum entanglement between quantum state devices. The combination of a Shannon network and a quantum network can implement a quantum teleportation network. Again, to simplify this discussion the quantum teleportation network is consider a form of quantum network.

While basic Boolean Algebra is commonly taught in most electrical engineering and computing curricula, a definition is included here to insure prosecution estoppel. Suppose that A and B are two Boolean variables, A and/or B is equal to A or B or (A and B). This definition will be applied throughout this document to facilitate the discussion, which would otherwise require a much longer elucidation of the combinations being described. As applied to any potential claim, this means that if an embodiment includes A and/or B, then the embodiment may include A alone, B alone or A and B together. If a second embodiment includes A and/or B and/or C, then this second embodiment may include A alone, B alone, C alone, A and B without C, A and C without B, B and C without A, as well as A and B and C. Also note, listing A, B and/or C will refer to the same thing as A and/or B and/or C.

This document discloses convenient and secure solution to a number of technical problems including, but not limited to, one or more of the following shown in FIG. 5D: password management, authentication da theft, additional verification, point-of-sale authorization, delegated approval, access to sensitive da, content access control, enterprise infrastructure access, automated conditional approval, spontaneous agreement approval, Internet Of Things (IOT) device management, service offer management, delivery offer management. By way of further clarification, spontaneous agreement approval may involve approval of a spontaneous purchase. Spontaneous purchases may include approval of a bet regarding a gambling event.

Authorization protocols, with their requirement for authenticated login sessions between end users and service providers, can be replaced by various embodiments of the CAS method and its apparatus implementations. Any of the CAS methods and their implementations provide convenient security for the clients, CAS providers, CAS enabled providers and CAS client applications as further shown in the drawings and discussed in the rest of this document.

BRIEF DESCRIPTION OF THE DRAWINGS

FIG. 2A to FIG. 2E show some details of the prior art of FIG. 1A to FIG. 1F, with opportunities for authentication da theft;

FIG. 4A to 4G show an example of a basic approval method starting a request for an approval generated and sent from a second end user to the first end user (introduced in FIG. 3A to FIG. 3C). This leads to generating an approved transaction in FIG. 4G;

DETAILED DESCRIPTION OF THE DRAWINGS

The Certified Approval Service (CAS) addresses the need for service approval from this new perspective, decoupling approvals from any particular user login identity. Instead, Certified Approval Messages can be verified by the recipient independently of a user login session. The end users don't need to be logged in to grant approvals, in fact, they don't even need to have previously established an account with the service provider.

Figure 1A:
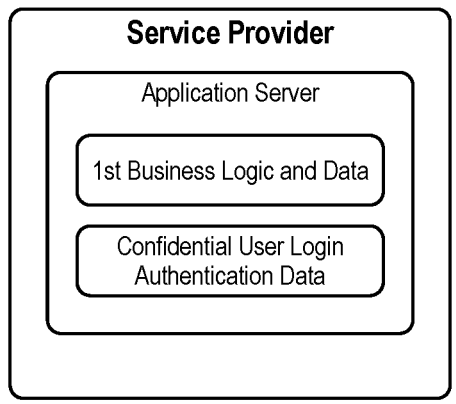
FIG. 1A to FIG. 1F shows a prior art example of the operational flow of the login based approval process.
Figure 1A:
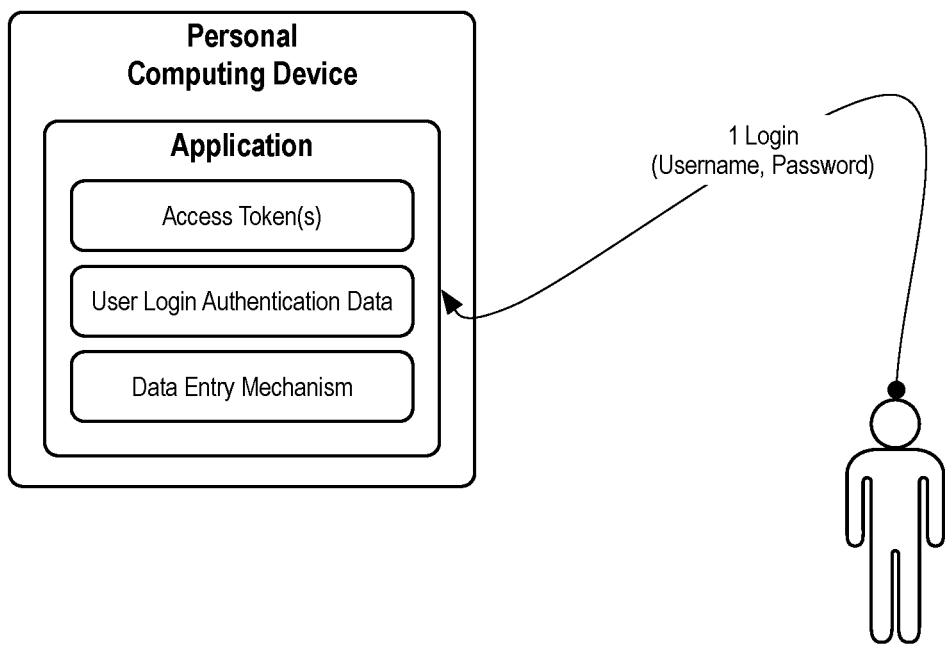
Figure 1B:
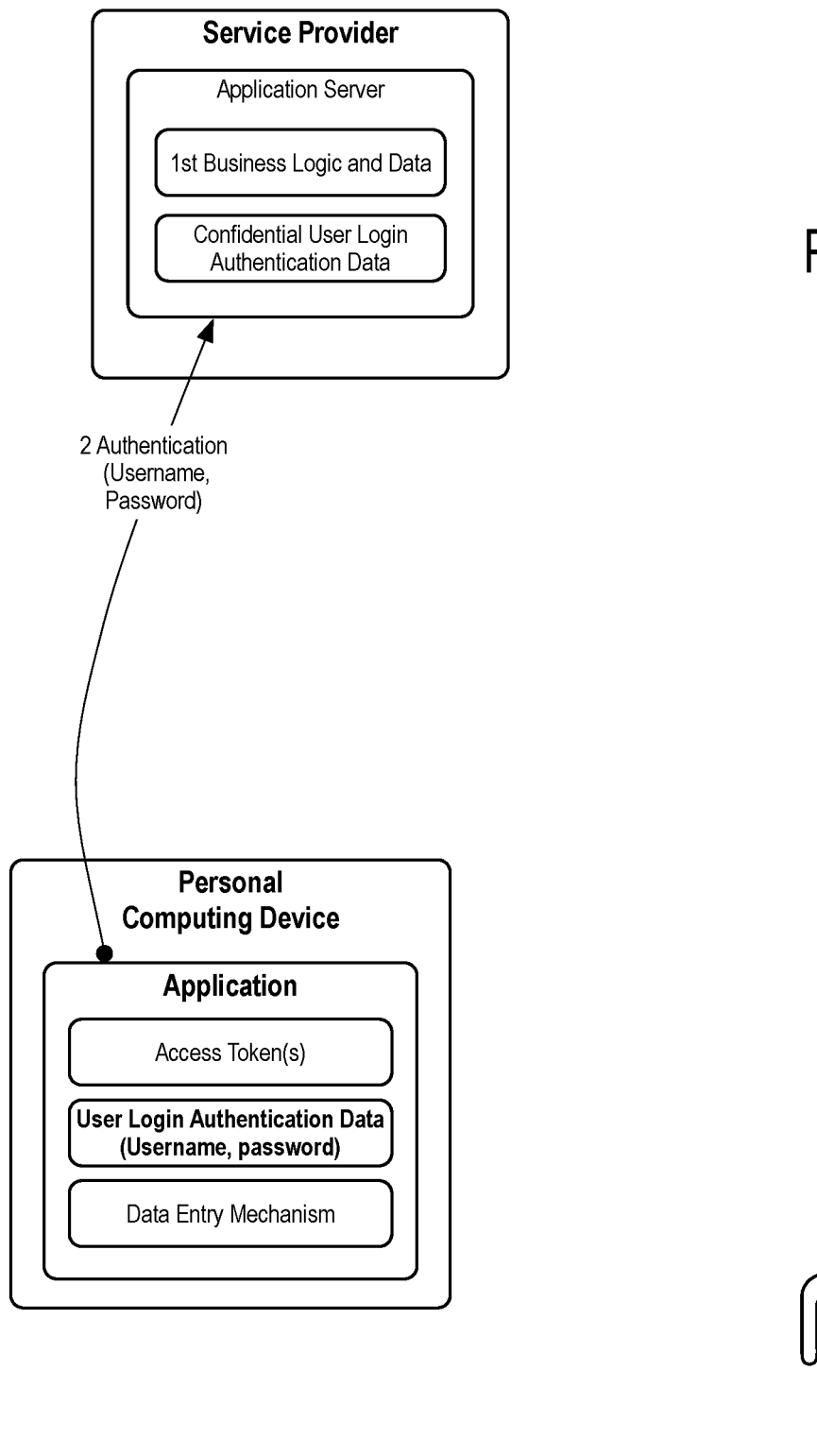
Figure 1C:
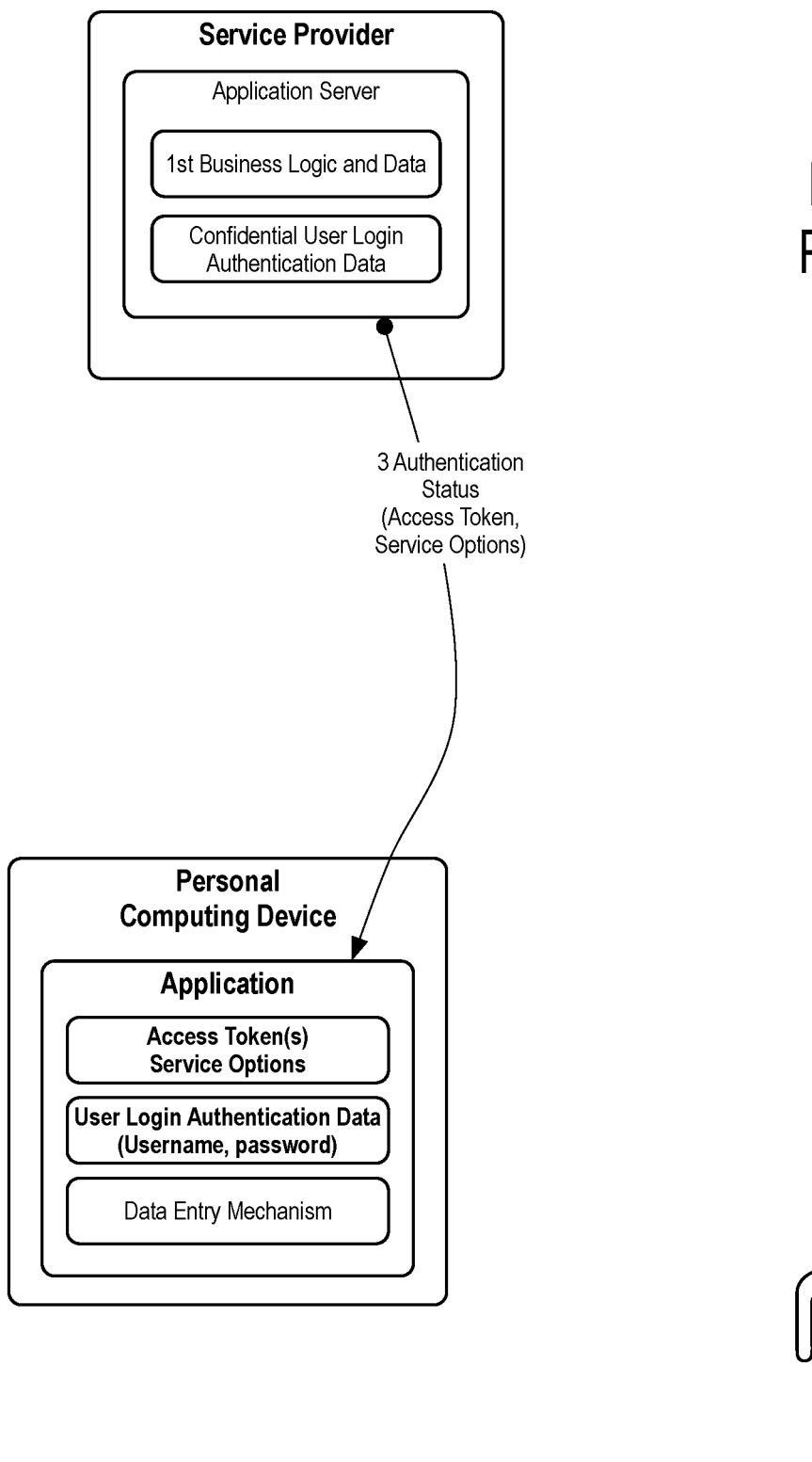
Figure 1C:
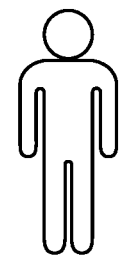
Figure 1D:
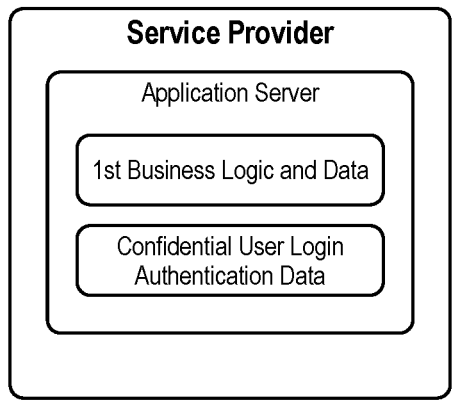
Figure 1D:
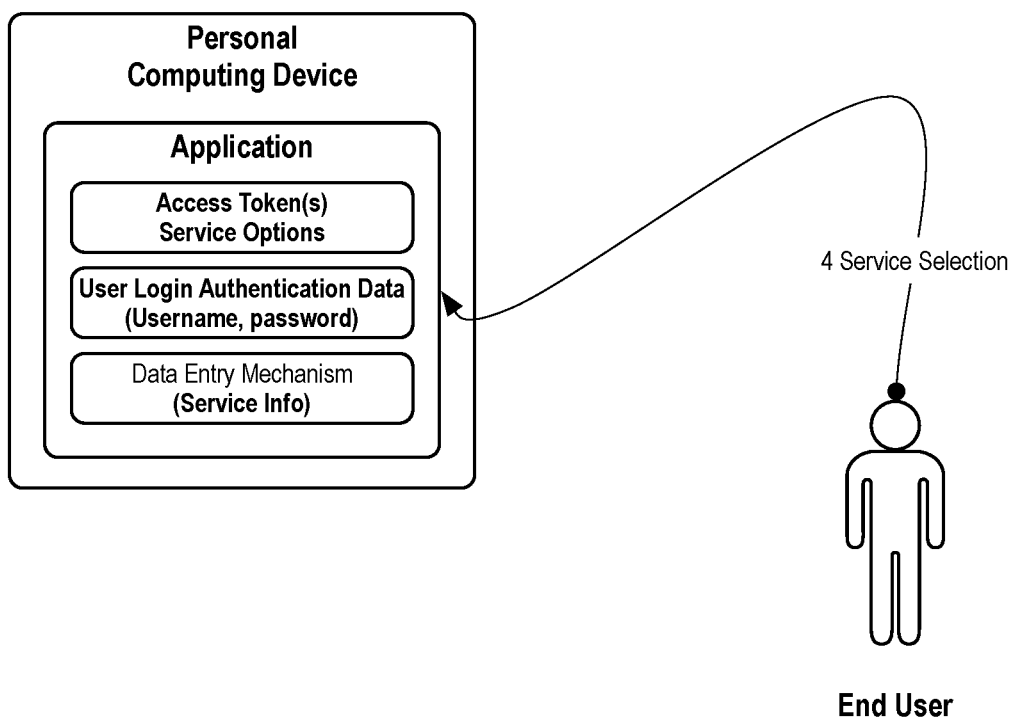
Figure 1E:
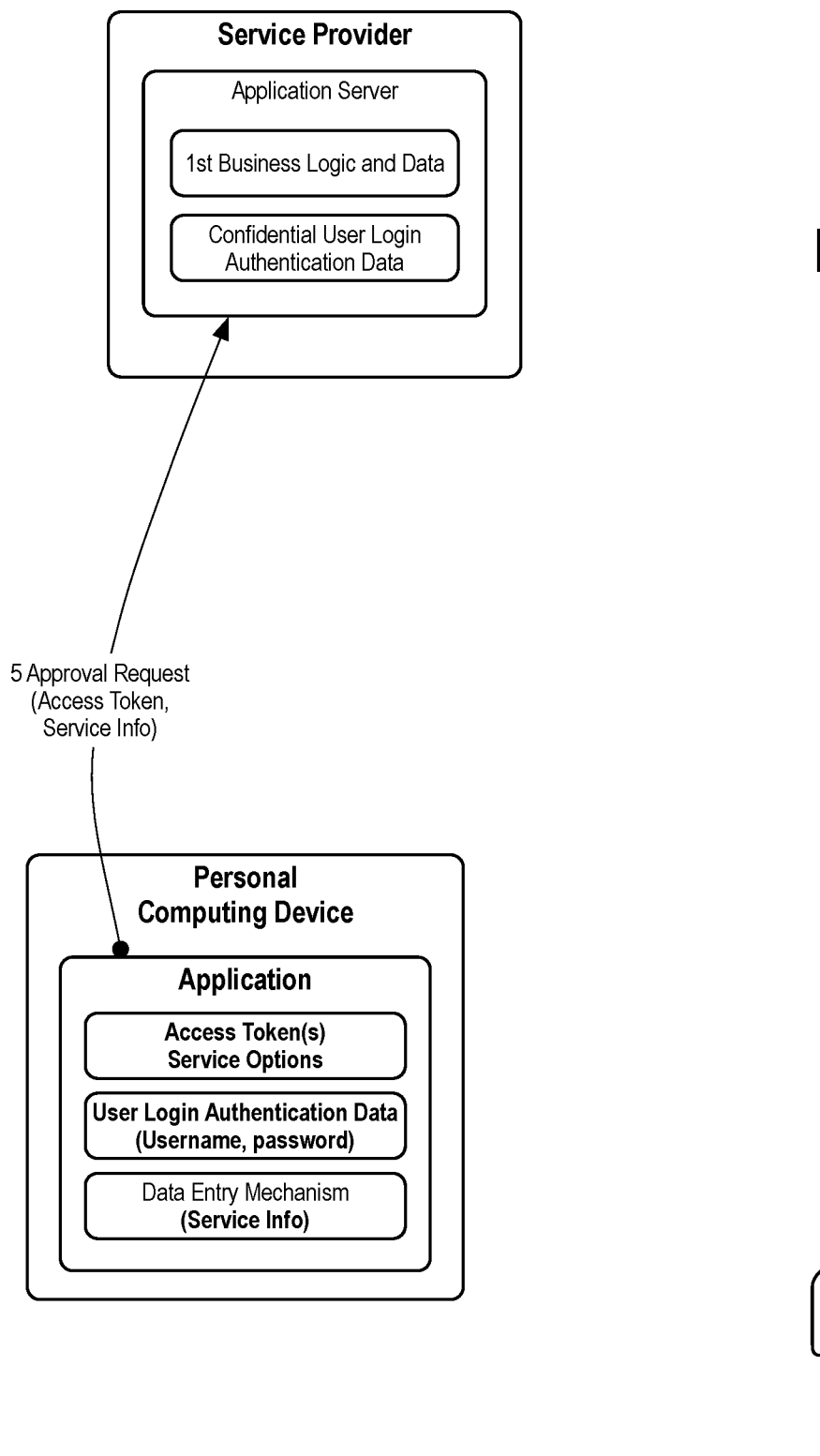
Figure 1E:
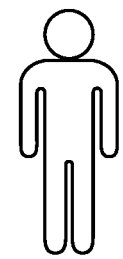
Figure 1F:
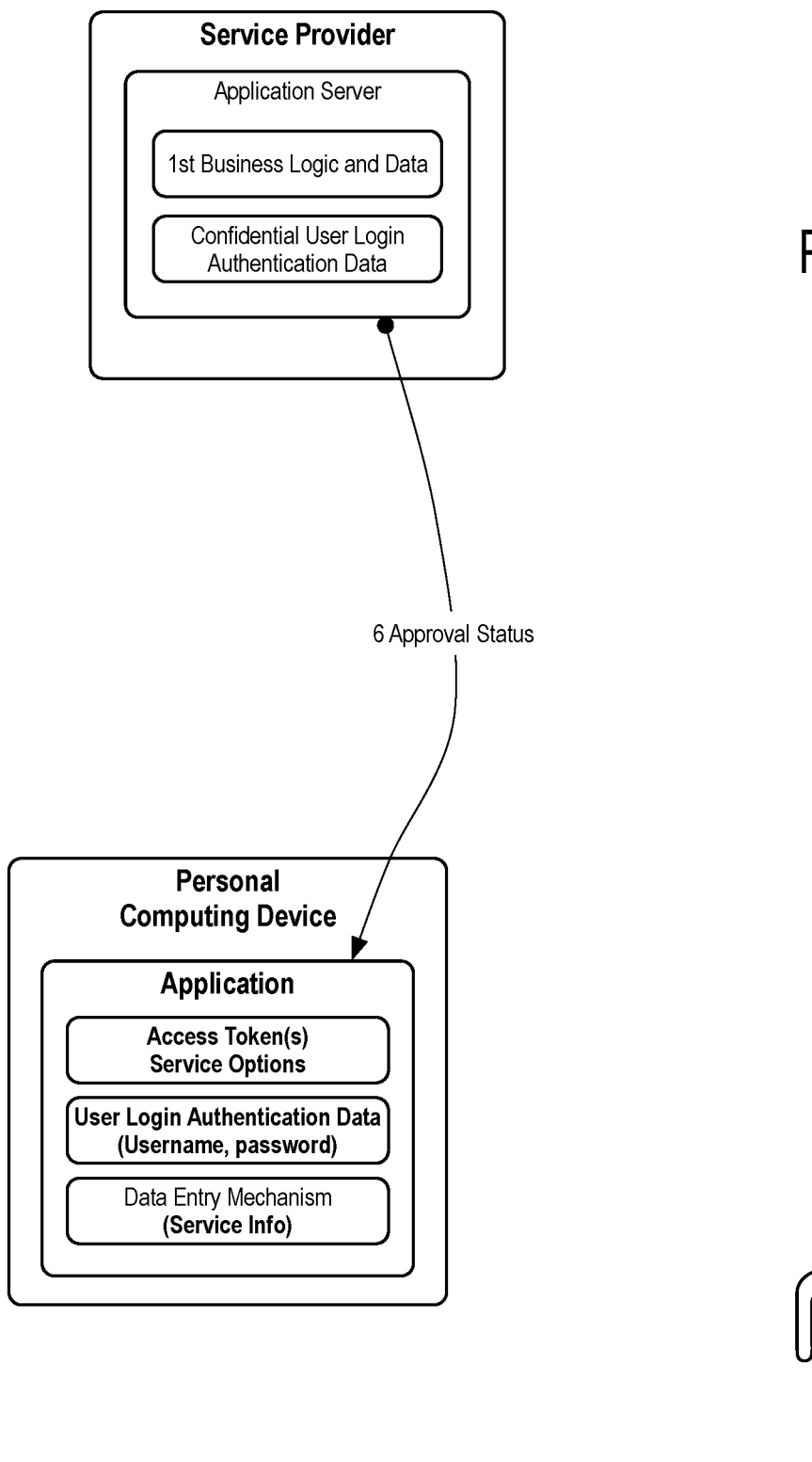
Figure 1F:
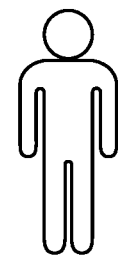
Figure 2A:
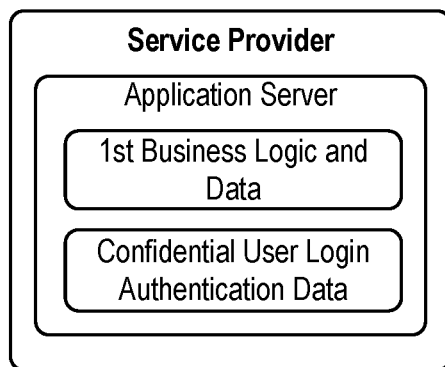
Figure 2A:
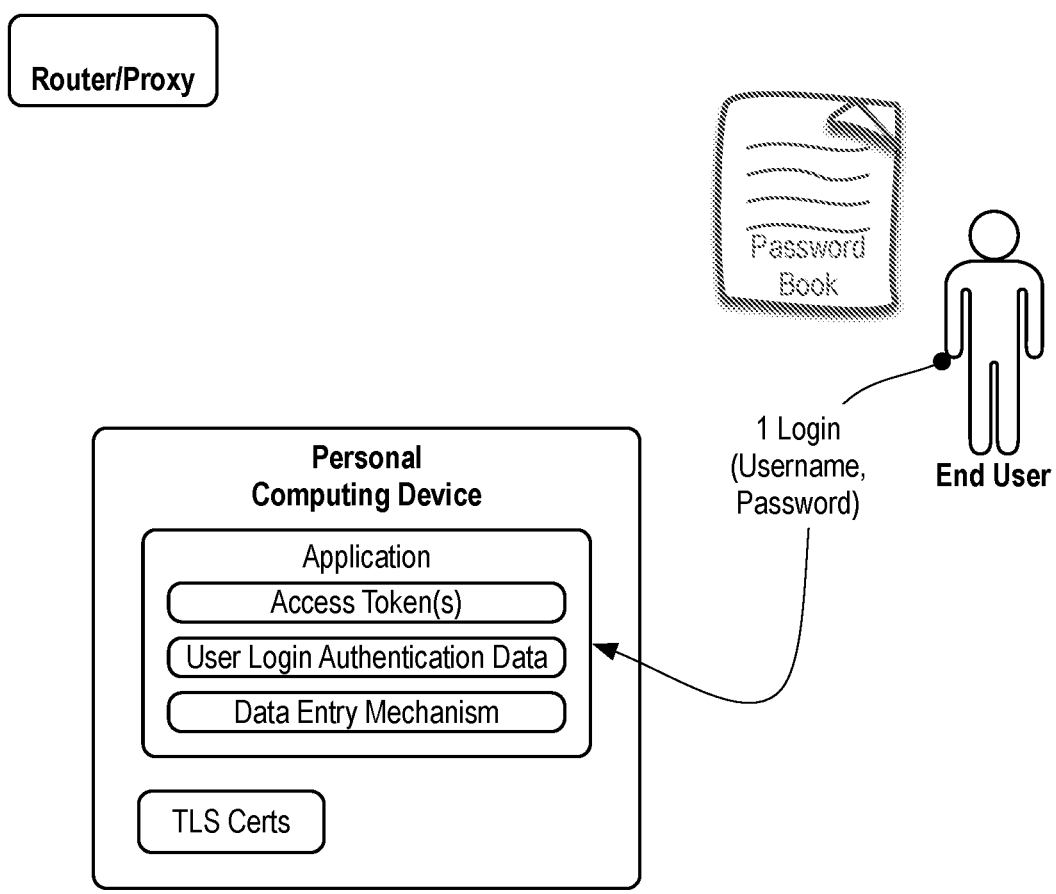
Figure 2B:
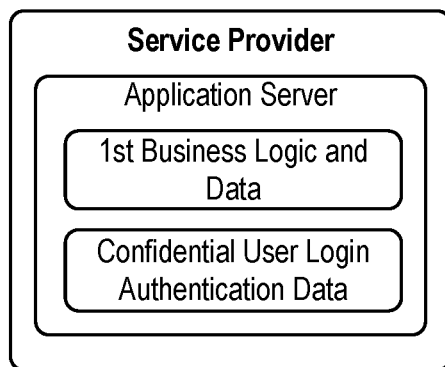
Figure 2B:
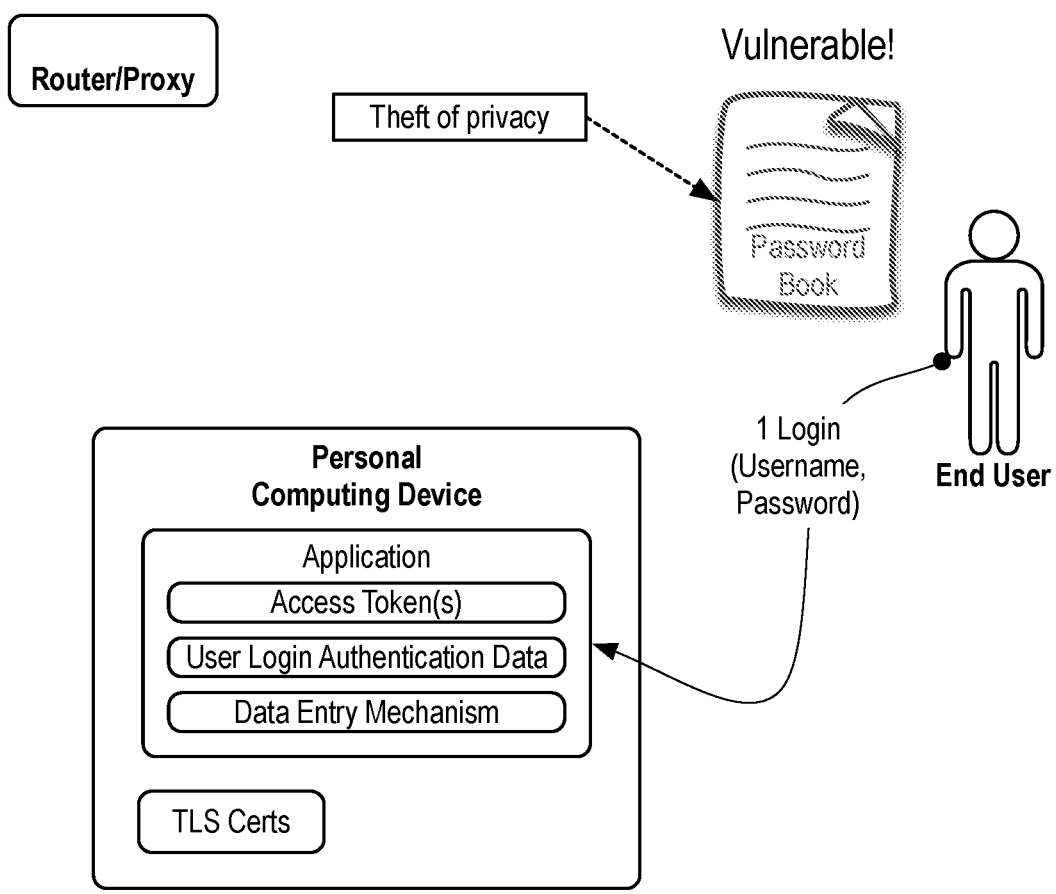
Figure 2C:
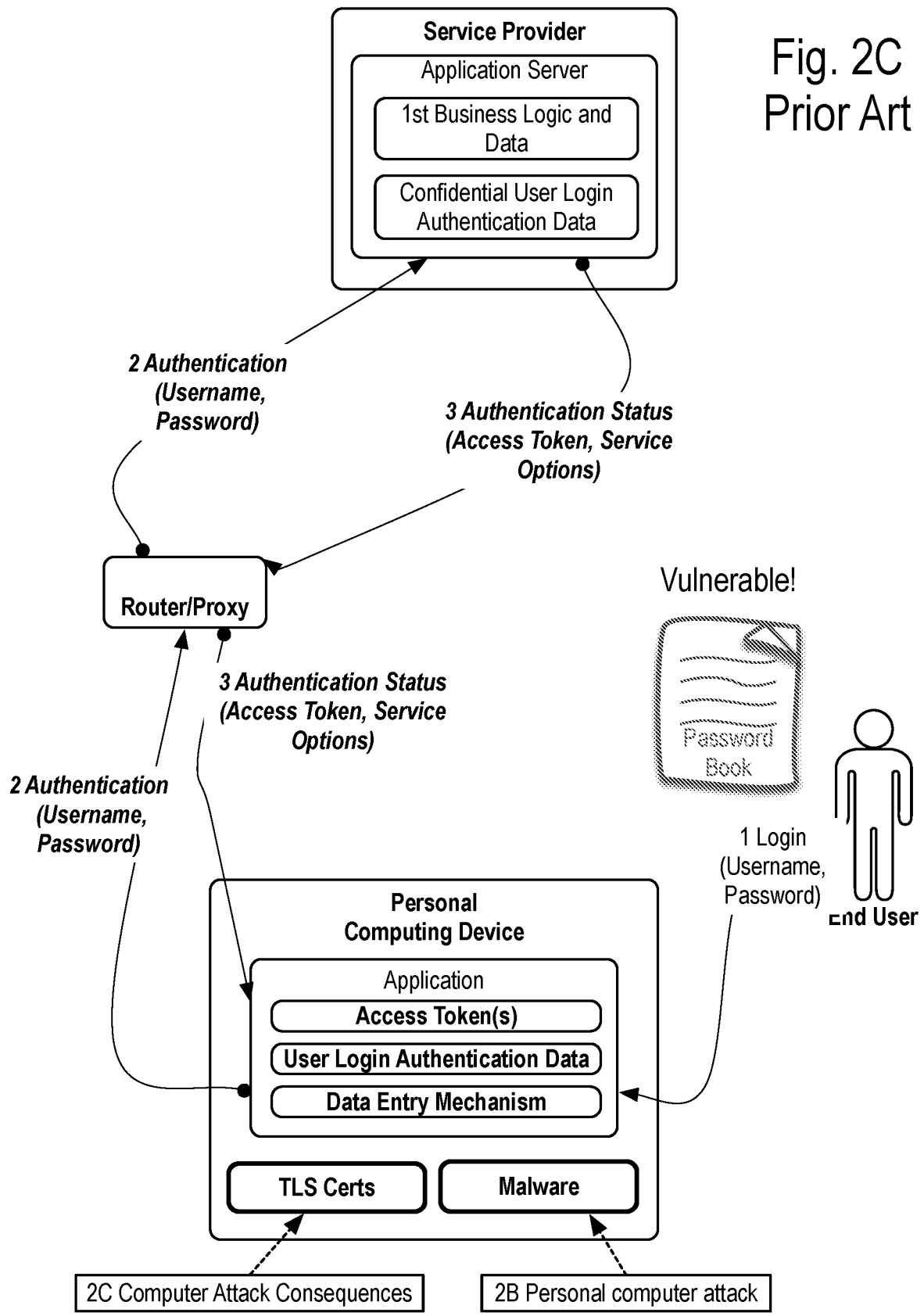
Figure 2D:
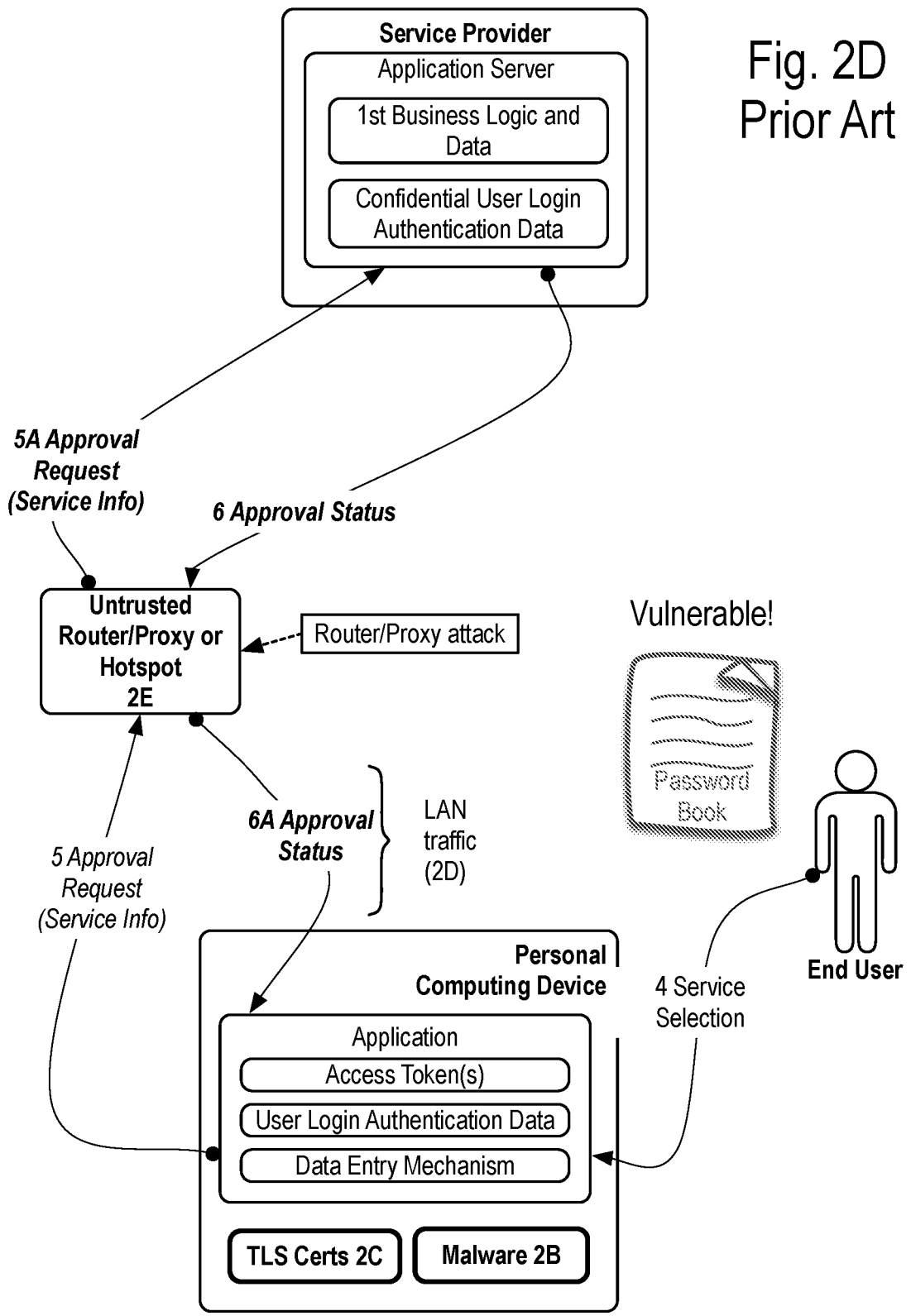
Figure 3A:
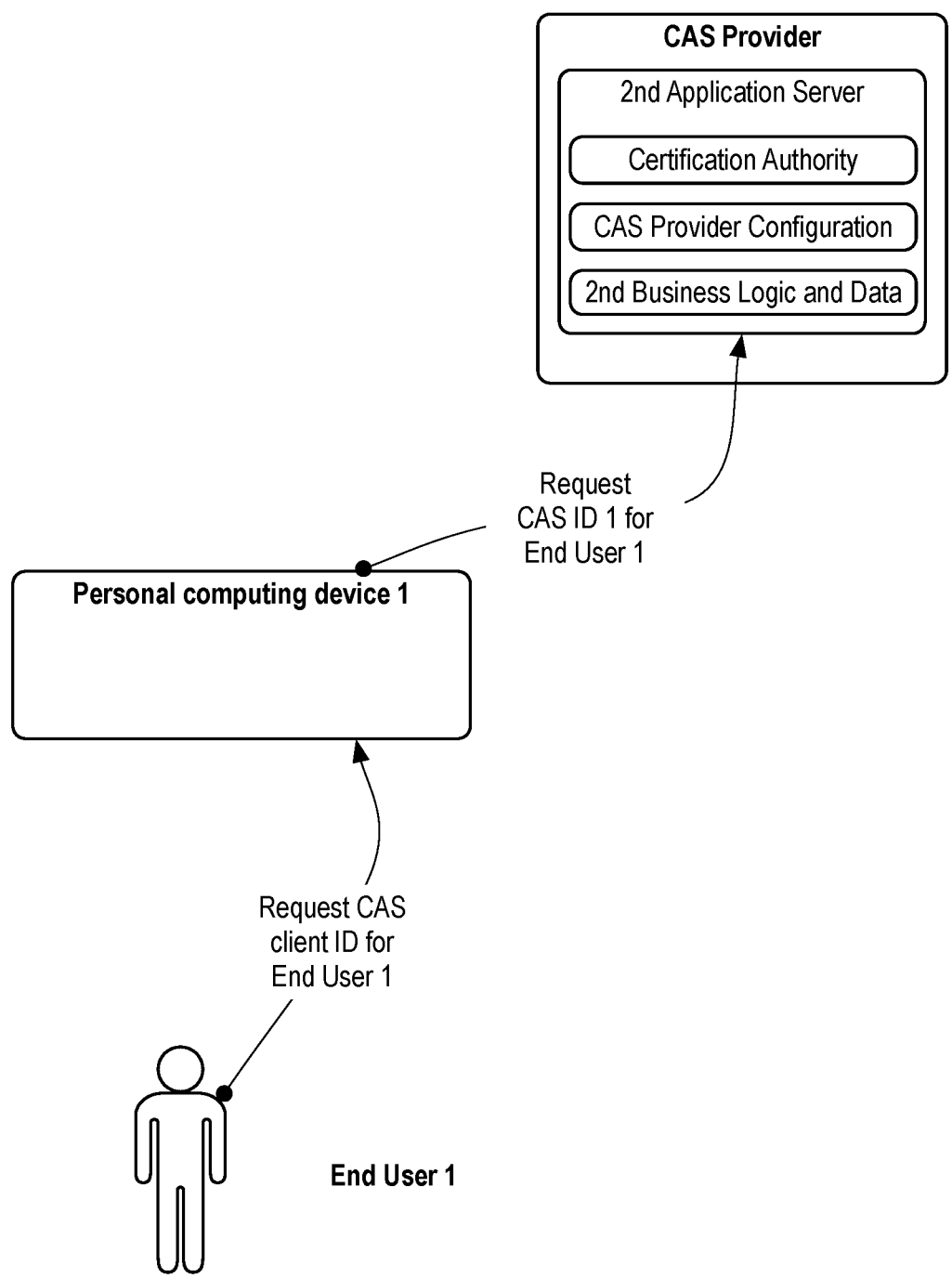
FIG. 3A to FIG. 3C shows an example of an end user operating a personal computing device interacting the a Certified Approval Service (CAS) provider; the end user requests a CAS ID, which the personal computing device sends to the CAS provider, which in turn delivers a CAS device configuration; the personal computing device responds to the CAS device configuration to become a CAS device; the CAS device receives an authentication process associating the CAS ID with the end user.
Figure 3B:
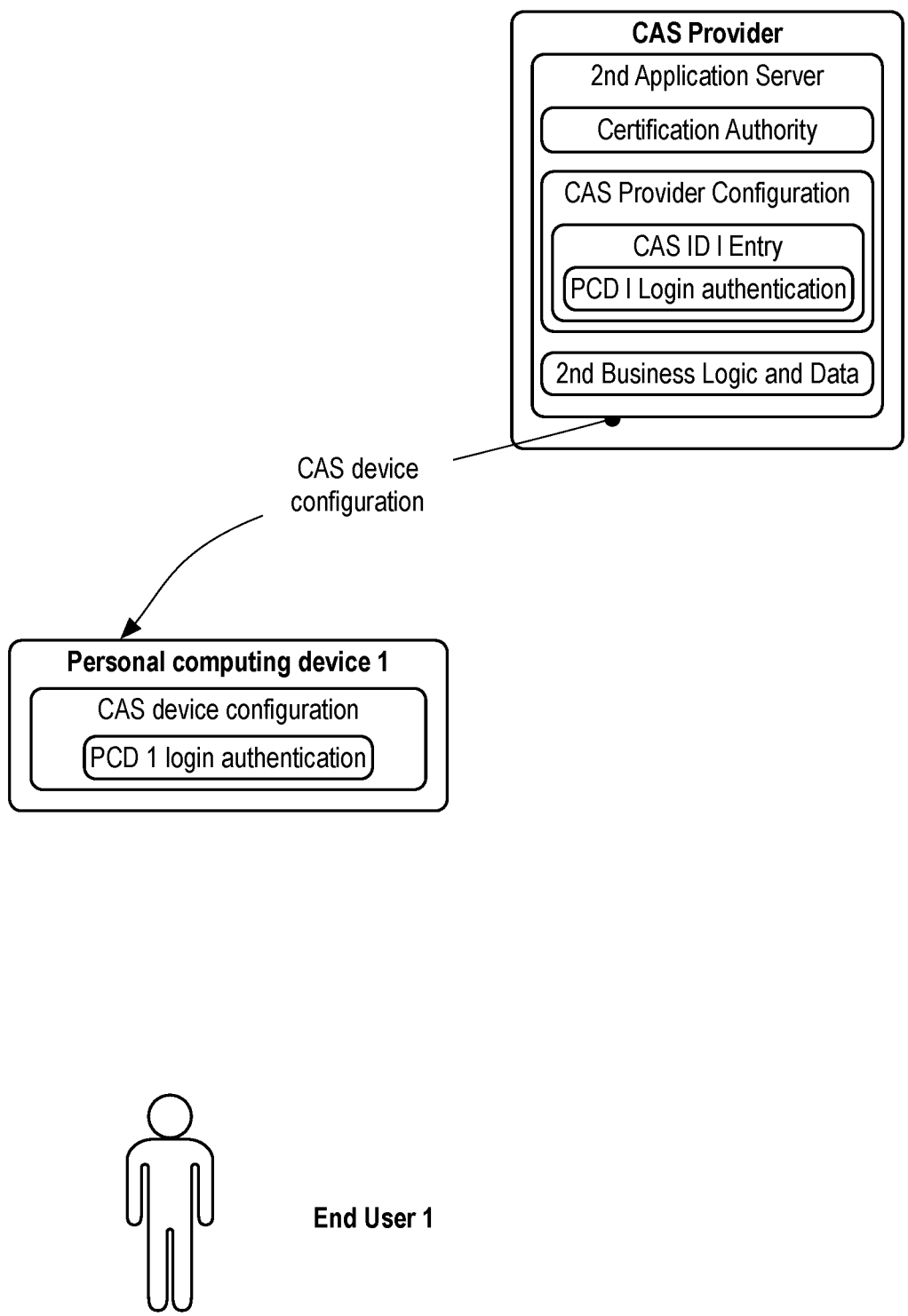
Figure 3C:
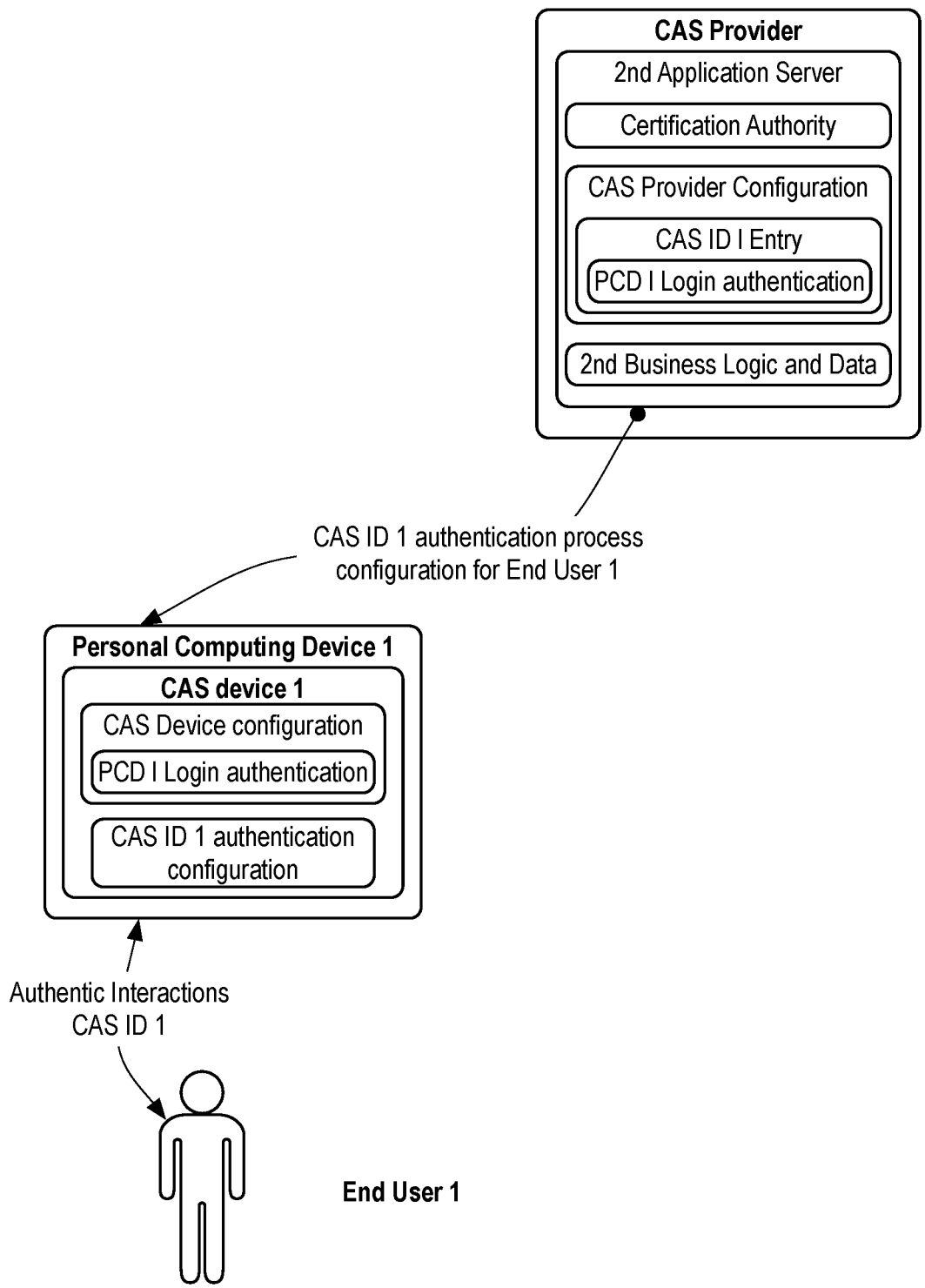

FIG. 3A to FIG. 3C shows an end user requesting and receiving access to a CAS provider. FIG. 3A shows an end user operating one or more personal computing device(s) interacting a Certified Approval Service (CAS) provider. An end user requests a CAS Identification (ID) by interacting with one or more of their personal computing devices. The personal computing device(s) communicates the request to a CAS provider implemented as an apparatus which can communicatively interact with the personal computing device(s).

A Certified Approval Service (CAS) Provider is an entity directing a 2nd Application Server to elicit, verify, repackage, and/or deliver approval messages between CAS end users. The entity is not a human. The entity may, or may not, be directed/managed by a human. The entity may, or may not, represent one or more of the following: a human, a business, a non-profit organization, a government organization, or a non-government organization.

The repackaging supports individualized encryption and other security tools to minimize the possibility of adversaries successfully snooping or stealing authentication protocol specifics or intrude upon the privacy of the interactions.

The end user requests a CAS ID, which the personal computing device sends to the CAS provider. To simplify this discussion, the overall operational flow is derived from a CAS provider configuration, which may configure communications, memory, and operations of the application server. A certification authority provides recognition of various CAS Identifications (CAS IDs) with responses based upon these certifications being used to repackage requests and CAS user responses between CAS devices.

When this stage of the communicative interactions is completed, FIG. 3B shows the CAS provider including a modified CAS provider configuration, now including a CAS ID 1 entry further including a Personal Computing Device (PCD) login authentication associated with Personal Computing Device 1. The CAS provider sends a CAS device configuration to the personal computing device, where it is received. The personal computing device responds to the received CAS device configuration to create a CAS device configuration in the personal computing device. The CAS device configuration includes a PCD 1 login authentication. Note, that the PCD 1 login authentication is not a user login authentication. As a consequence, very long password sequences or sequence generators can be conveniently used by the end user. The sequence generators may not repeat themselves for a very long time, making hacking more difficult.

When configured by the sent CAS device configuration, the personal computing device becomes a CAS device able to interact with the CAS provider as shown in FIG. 3C. The CAS device and the CAS provider may implement deep encryption and other security protocols, with no inconvenience to the end user. With these convenient and secure communications protocols in place, the CAS device receives a CAS ID authentication process configuration from the CAS provider. The received process configuration is installed and interacts with the end user to establish one or more authentic CAS ID interactions. Hereafter, the end user of FIG. 3A to FIG. 3C is referred to as the first end user.

This CAS Provider may also direct its Application Server to distribute, provision, and/or control CAS related software for personal computing devices, and/or other computing devices operated for other service providers, as shown in the drawings which follow. Note that the CAS Provider's directions to the 2nd Application Server may be encoded in the business logic, and combined with configuration and certification da, and may possibly involve running on one or more additional programs on at least one computer.

FIG. 4A to 4G show an example of a basic approval method starting a request for an approval generated and sent from a second end user to the first end user (introduced in FIG. 3A to FIG. 3C). This leads to generating an approved transaction in FIG. 4G. Note that in these drawings, the certification authority now includes two CAS ID entries, entry 1 represents end user 1, and entry 2 represents end user 2. CAS ID entry 1 includes PSD 1 login authentication component(s). CAS ID entry 2 includes PSD 2 login authentication component(s). The PSD login authentication component(s) enable communications between the CAS provider and the two personal computing devices to be distinctly configured, increasing the security of the respective communications without any inconvenience to the end users.

Figure 4A:
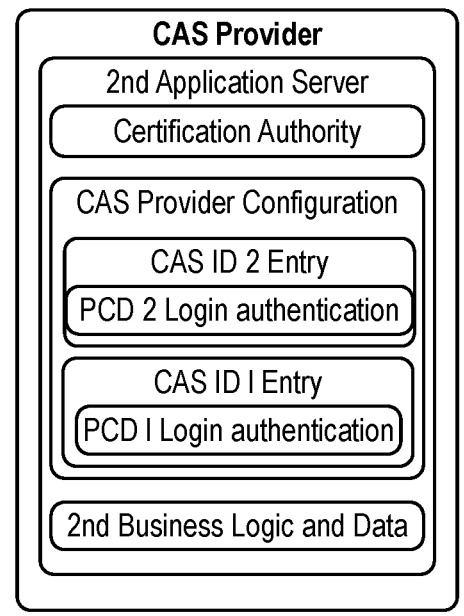
Figure 4A:
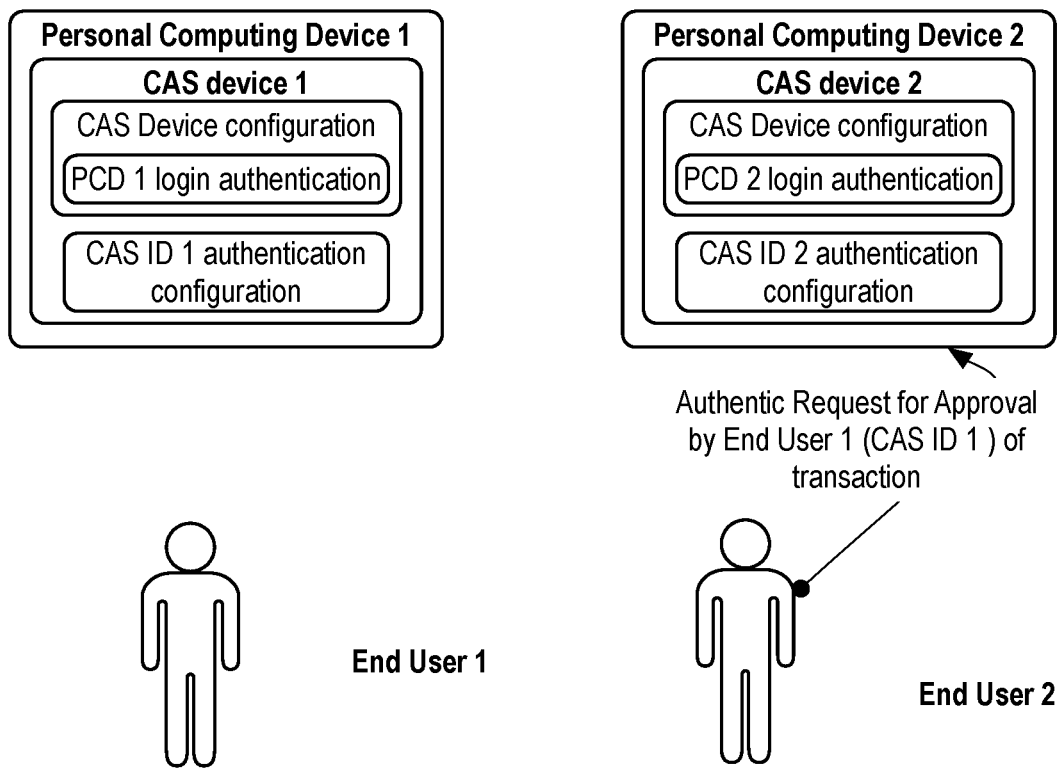

A second end user requests and approval of the first end user for a transaction in FIG. 4A. The approval request is created by the second end user authentically interacting with a second CAS device based upon the CAS device configuration in the second personal computing device.

A Certified Approval Request of the transaction, using the CAS ID 1 for the first End User, is sent by the second CAS device to the CAS provider in FIG. 4B. This message is packaged based upon the PCD 2 login authentication component(s) of the CAS device configuration. The message is received by the CAS provider and unpacked as an approval request, based upon the CAS ID 2 entry and its PCD 2 login authentication component(s).

The CAS provider repackages the approval request received from the second CAS device into a Certified Approval Request, using the security protocols configured into the communications between the CAS provider and CAS device 1, without any inconvenience to either end user as shown in FIG. 4C. The first personal computing device receives the message and unpacks the certified approval request internally.

Figure 4D:
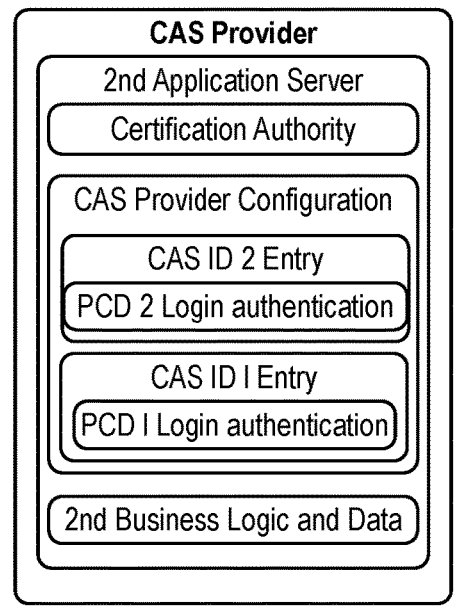
Figure 4D:
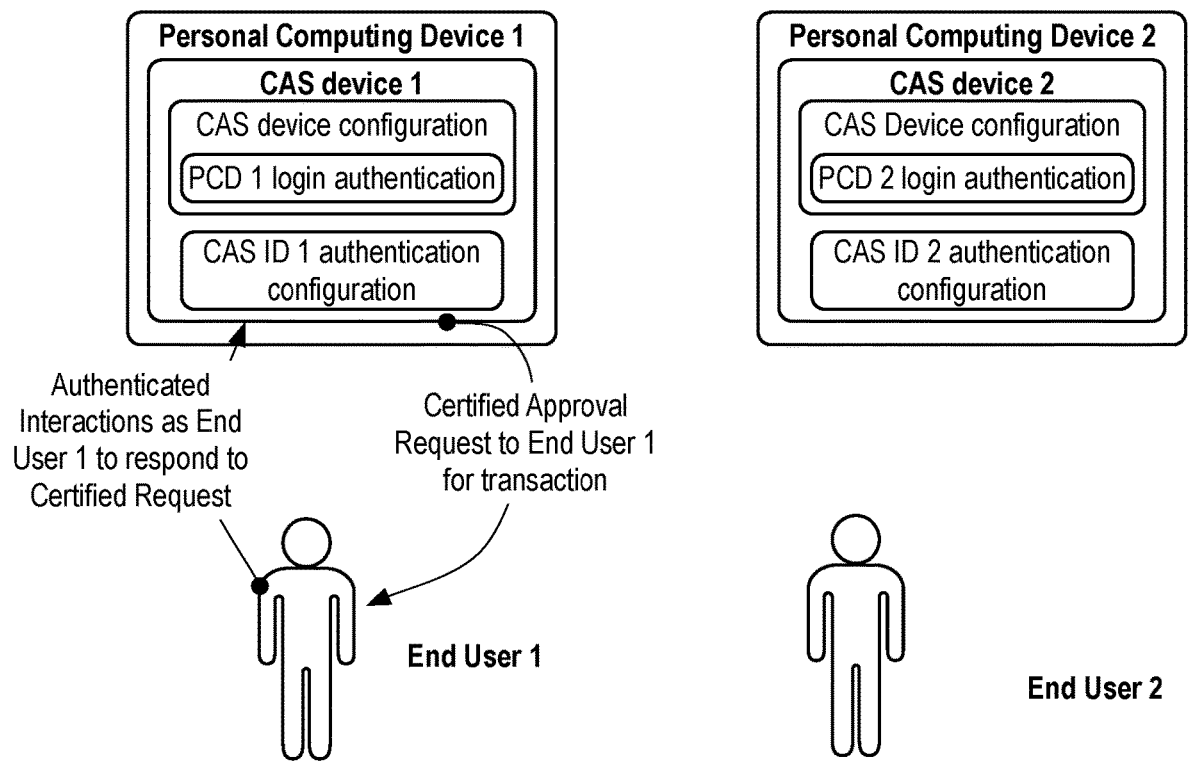

The first end user receives the certified approval request presented by the first personal computing device in FIG. 4D. The first end user authentically communicates with the personal computing device in response to the certified approval request presentation. This authentic communication is typically not over a wide-area network, it is between the end user and their personal computing device. Even if Bluetooth is involved with the authentic interactions, they may be heavily encrypted, and possibly hidden from snooping, without any inconvenience to the end user.

Figure 4E:
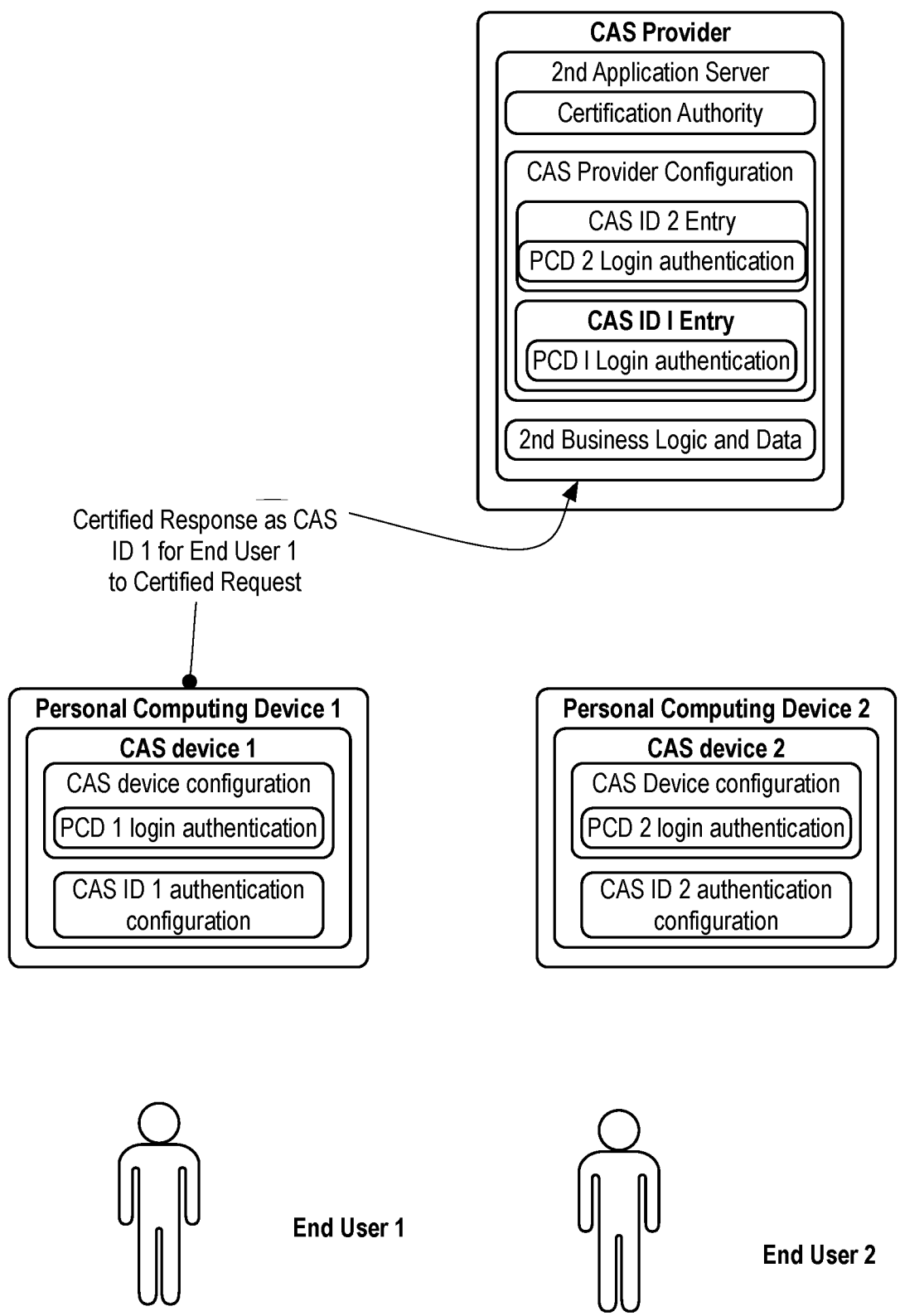

Upon completing the presentation and authentic interaction of FIG. 4D, the CAS device 1 sends a certified response by the CAS ID 1 of the first end user to the approval request, as shown in FIG. 4E. The certified response is sent to the CAS provider as a very secure communication, again without any inconvenience to the end user.

Figure 4F:
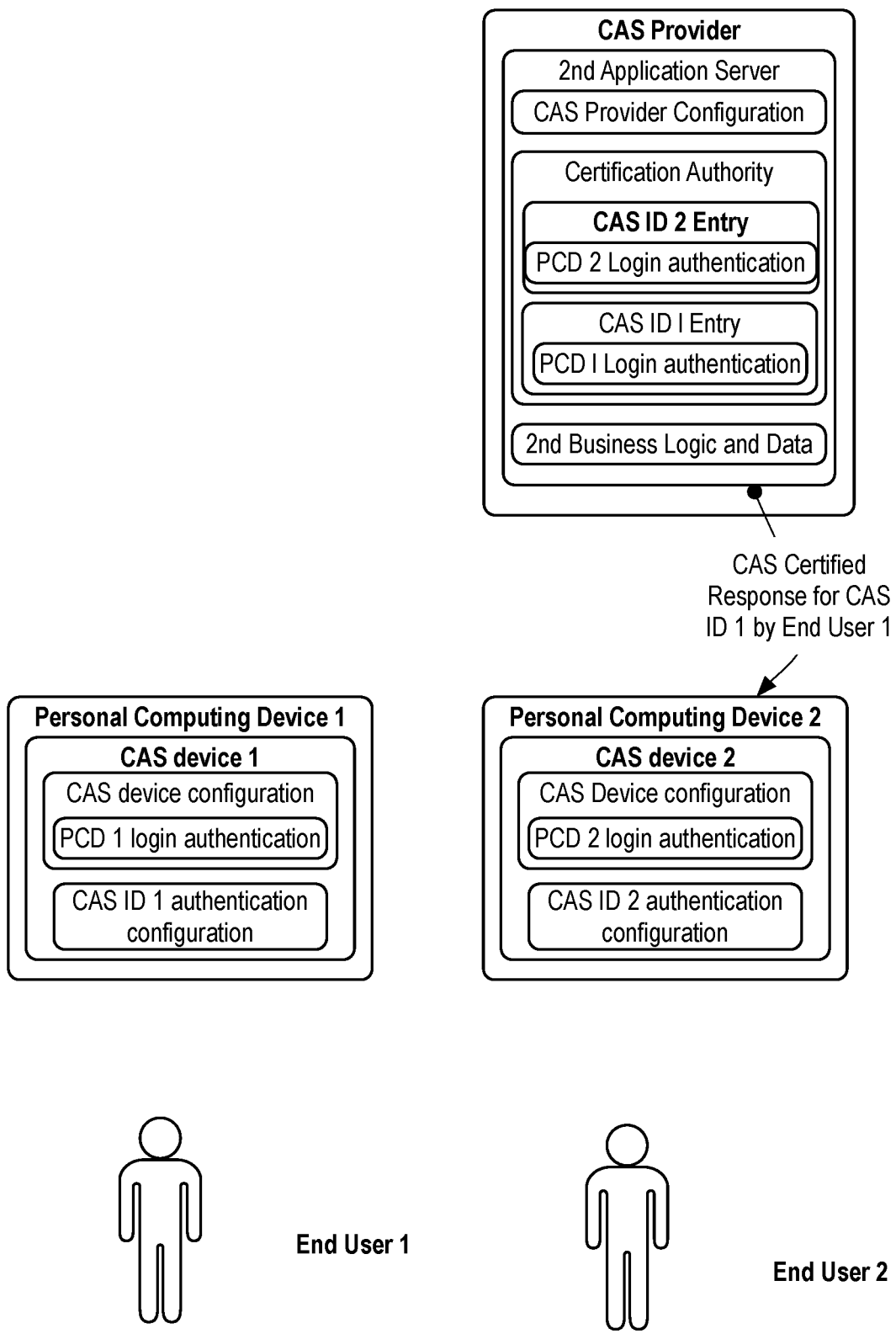

The CAS provider receives the certified response and again repackages this message to create and send a CAS Certified Response for the CAS ID 1 (of the first end user) to the second CAS device as shown in FIG. 4F. The transmission is also separately, deeply, secured, but without any inconvenience to the end users.

Figure 4G:
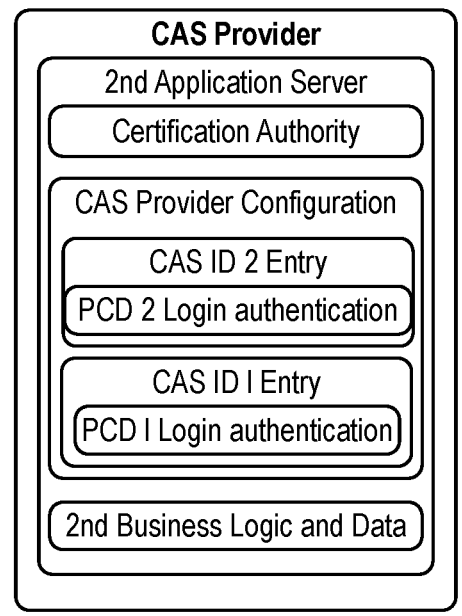
Figure 4G:
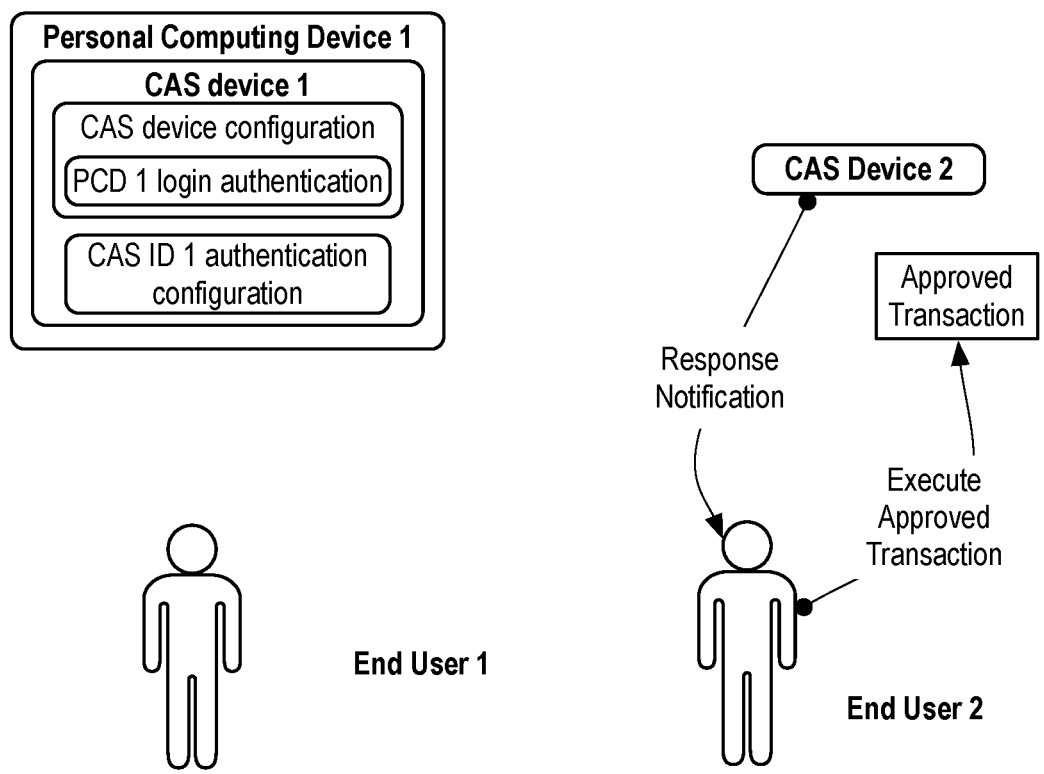

FIG. 4G shows the second CAS device responding to the received CAS certified response, by presenting to the second, requesting, end user the response to the approval request. The second end user responds the response by executing the transaction, which creates the approved transaction.

Figure 5A:
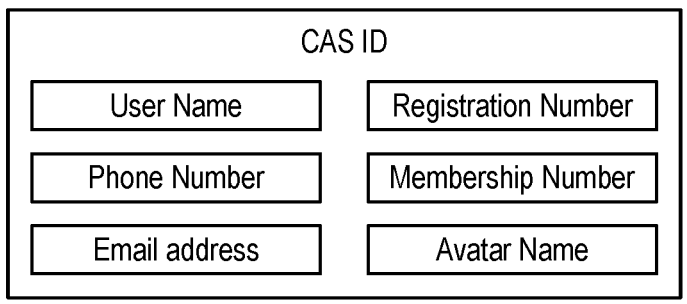
FIG. 5A shows some examples of the CAS ID as used herein.

FIG. 5A shows some examples of the CAS ID. The CAS ID may include, but is not limited to one or more of the following: a user name, a phone number, an email address, a registration number, a membership number, and/or an avatar name. Avatar names are a term used to describe user chosen identifications, for example, aa found in online game playing, dating web sites, trading web sites, and some chat room online applications.

Figure 5B:
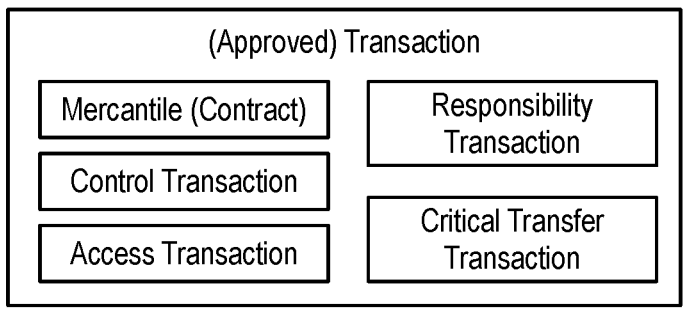
FIG. 5B shows examples of transactions which may be approved as shown in in FIG. 4G.

FIG. 5B shows examples of transactions which may be approved as shown in in FIG. 4G. As used herein, transactions may include, but are not limited to, mercantile transactions, control transactions, access transactions, responsibility transactions and/or supervised transactions.

As used herein, a mercantile transaction (possibly a contract) refers to an agreement, which in its simplest form, is between at least two parties, based upon one party agreeing to perform a first activity, such as transferring ownership of something, in exchange for the second party agreeing to perform a second activity in response to the commitment to perform the first activity.

A responsibility transaction refers to transactions involving both parties exercising responsibilities, such as management of a medical database interacting with a physician. The management may permit the physician to access the medical database and the physician may interact with the medical database, both based upon a second agreement in which both of these parties acknowledge their responsibilities to maintain a commitment to act in accord with the Hippocratic Oath, or a more recent standard, such as the AMA Code of Medical Ethics in the United States, and the British General Medical Council's Good Medical Practice. Many of these standards require the physician and/or medical researcher to act to improve the health or at least attempt to not harm the patients or studied individuals.

A critical transfer transaction will refer to a commitment to actions without the parties directly committing to act in each other's benefit. Consider the situation where a physician has a very ill patient. The patient has set aside a reserve of their stem cells in a stem cell repository. A critical transfer transaction between the physician and the repository may include the repository sending the stem cells of the patient at the physician's direction to some facility. In this sort of situation, the patient may not be conscious, the physician may never see the stems cells, and the repository may not directly benefit from the physician.

A control transaction refers to transactions which, when approved, control the operation of one or more devices. These operations may change a control of a device, such as open or close a valve, open or close a switch connecting two or more terminals, alter a thermostat setting, and so on. These operations may also change a setting such as the date and time, possibly at which another control operation is to occur.

An access transaction refers to situations in which a CAS End User wishes to grant a specific device, or person, controlled access to private data. The CAS Id entered by the 3rd-Party End User is that of the CAS End User who is expected to approve the request.

A supervised transaction refers to a transaction which may result from a supervised approval.

Figure 5C:
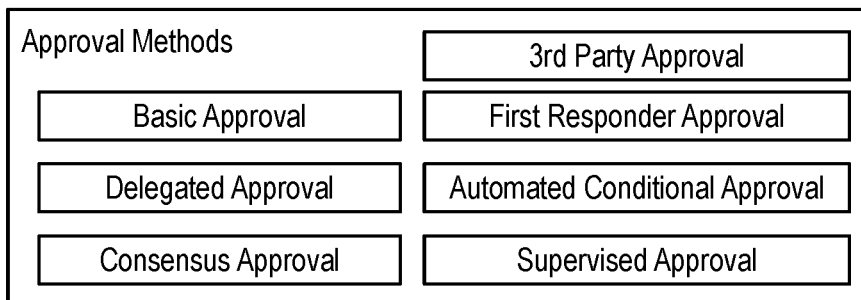
FIG. 5C shows some examples of the approval methods in accord with this disclosure.

FIG. 5C shows some examples of the approval methods in accord with this disclosure. The basic approval method was first shown in FIG. 3A to FIG. 4G. Other approval methods summarized in FIG. 5C, and further shown in subsequent drawings. These approval methods include, but are not limited to, a third-party approval method, a first responder approval method, a delegated approval method, an automated conditional approval method, a consensus approval method, and/or a supervised approval method. All of these approval methods are referred to as CAS approval methods, which may or may not be directly derived from the basic CAS approval method, depending upon the implementation derails, in particular, the configuration of the various computing devices involved in these various methods.

Delegated Approval refers to where a CAS End User can delegate approval authority to another End User if they anticipate being incapacitated or distracted. They may also do this if they do not wish to accept the liability of approving the request. FIG. 8 shows a Certified Approval Service (CAS) delegated approval flow, in which CAS End User 1, issues a Delegation Message (505) after the Certified Approval Request (501) has been sent. In some circumstances, the Delegation Message (505) may be sent ahead of time, and remembered by the CAS Provider, and applied to subsequent Certified Approval Requests according to flexible business logic. This pattern is applicable for any Certified Approval Request (501), no matter what triggered the request. Note that the CAS Device and CAS-Enabled Device are not shown for reasons of clarity.

Consensus Approval for transactions that require approval from several skeholders. Approvals may be combined in arbitrarily complex ways to derive the final consensus result.

First Responder Approval wherein the first response received from any authorized member of a group is considered sufficient and final.

Supervised Approval refers to approval in which a given CAS End User may approve requests within a predetermined set of parameters only; other approval requests automatically trigger involvement from one or more additional CAS End Users.

Automated Conditional Approval for automatically approving routine requests that do not exceed a predetermined threshold of significance. Human intervention is automatically triggered when an exception condition is triggered—for example, when a certain pattern of use is detected, or a pre-determined threshold of financial or legal liability is crossed.

Unsolicited Approval Requests to efficiently elicit approval to provide goods and services that have not been previously identified or requested by CAS End Users. The CAS Provider plays the important role of managing the flow of unsolicited approval requests to End Users via their CAS Clients. For example, by white-listing some Unsolicited Approval Requestors; blacklisting some others; or applying other business logic.

Peer Approval when a given CAS End User initiates an approval request autonomously, without involving a CAS-Enabled Service Provider, and routes the approval request to one or more other CAS End User(s. This arrangement is useful for streamlining approval workflows within an enterprise setting, for example.

An Ad-hoc Approval refers to situations in which a CAS-Enabled Service Provider seeks approval to provide service to a CAS End User who has no prior, established relationship with the provider.

Figure 5D:
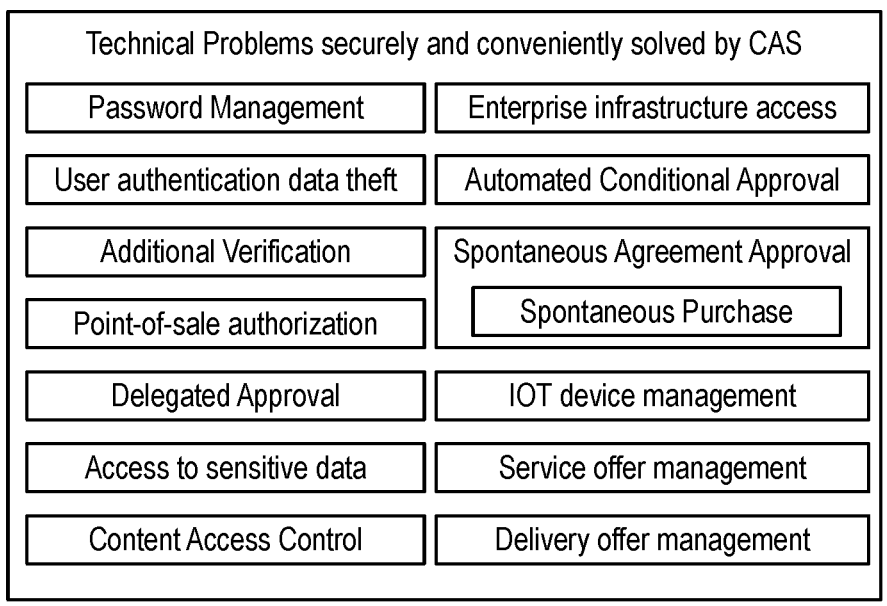
FIG. 5D shows at least some of the technical problems which may be securely and conveniently solved by this disclosure's approval methods outlined in FIG. 5C, and the rest of the Figures and specification.

FIG. 5D shows at least some of the technical problems which may be securely and conveniently solved by this disclosure's approval methods outlined in FIG. 5C, and the rest of the Figures and specification;

The significance of convenient security cannot be overstated. Secure deployment of the prior art is only possible with rigorous attention to myriad best practices, including "good password hygiene." Thus, the effective security of the prior art is mediocre at best: not (necessarily) because of any specific technical flaw(s), but because it simply requires too much effort from the typical End User and Service Provider. For example, few people can remember strings of more than a few random characters, and yet that is one of the essential requirements for effective login security.

For many people, the single most exciting consequence of the convenient Certified Approval Service is that it eliminates the need for logins and passwords altogether. But the Certified Approval Service is far more than a convenient substitute for logging in—it substantially increases the effective security for the millions of End Users and Service Providers who are not paranoid network security experts.

The convenient Certified Approval Service also provides a framework for implementing advanced approval protocols, such as: Delegated Approval, Consensus Approval, First Responder Approval, Automated Conditional Approval, and Supervised Approval. Login-based implementations of some of these approval flows are prohibitively cumbersome for general adoption. Again, the sheer convenience of the Certified Approval Service is what makes these innovations viable.

In addition to the technical problems of password management and authentication data theft highlighted above and that urgently need solutions, several more are identified here: Additional Verification, Point-of-Sale Authorization, Enterprise Computing Infrastructure Access Control, Spontaneous Purchase or Service Agreement, Controlling Access To Sensitive Da, Provisioning Internet-Connected Devices, Parental Control Over Streamed Content Consumption, Efficient Delivery and Approval of Relevant Service Offers, and/or Fine-Grained Access Control To Web Content.

Various implementations can solve one or more, or possibly all, of these technical problems, discussed in detail in the following paragraphs.

Password Management: represents a class of major technical problems associated with authenticated session establishment. In order for End Users to authenticate themselves directly to service providers, they each must securely manage a sizable table of access credentials. There are many pain points associated with this model, including:

the need to change passwords at inconvenient times
inconsistent password selection rules
difficulty remembering conforming passwords
synchronizing new passwords to all devices
inconsistent password manager coverage across devices
minimal password manager support for smartphone
Application and Client "Good Password Hygiene" suggests:
passwords should be hard to guess, and are often expected to include digits, special characters, and a mixture of upper- and lower-case letters.
passwords should be unique for each service
passwords should be changed frequently
ideally, a single-device password should be used for each device that needs access to accounts for services such as email, networked calendars, banking, etc.
passwords should not be written out on sticky-notes taped to the side of a computer monitor, nor sent in email messages It is practically impossible for most End Users to maintain good password hygiene. Conforming passwords are usually hard to remember, and also tedious to enter on some devices. End Users have to choose between security, and convenience—most choose convenience.

Authentication Da Theft: Earlier sections described the many opportunities for attackers to surreptitiously obtain sensitive consumer da for fraudulent or otherwise unsanctioned use, as shown in FIG. 2A to 2E and discussed in the Background.

Many service providers augment the security of their users' login sessions by periodically challenging those users to provide additional forms of authentication, such as:

answering personal questions (city of their birth, mother's maiden name, etc.);
demonstrating receipt of a confirmation email, typically by following a uniquely-crafted link embedded in the message;
entering a dynamically-generated, single-use PIN, delivered via SMS to their mobile phone
All of these are variously flawed: answers to "personal" questions are not particularly hard to deduce; many End Users deploy the same password for all their accounts, so a crook with access to one of a victim's accounts will probably be able to intercept a confirmation email; and NIST no longer recommends two-factor authentication using SMS (https://pages.nist.gov/800-63-3/sp800-63b.html, 5.1.3.2. Out-of-Band Verifiers).

Figure 6:
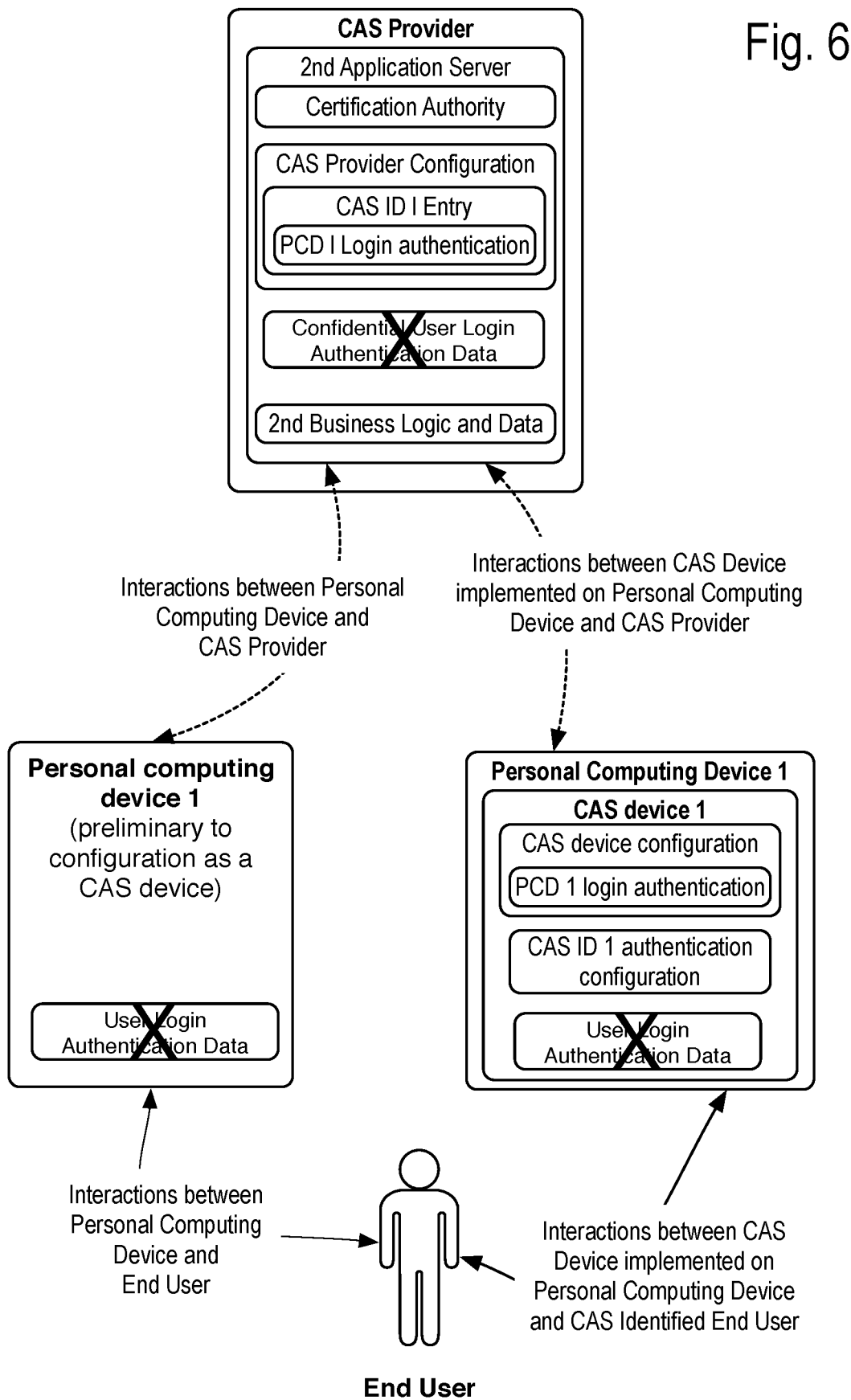
FIG. 6 shows the operational flow of the Client Approval Service (CAS), of FIG. 3A to FIG. 4G, compared to the authenticated session method of the prior art, of FIG. 1A to FIG. 2E.

FIG. 6 shows a comparison of the basic approval method's operations on a single personal computing device, such as the first personal computing device of FIG. 3A to FIG. 4G, compared to the prior art login session approach, of FIG. 1A to FIG. 2E. Nobly, neither the personal computing device nor the application server implementing the CAS provider needs to contain any user login authentication da, making it impossible to steal that da from these computing devices, nor intrude on an authenticated login session involving the end user, because one never takes place.

Point-of-Sale Authorization refers to Point-of-Sale terminals at checkout stations today, which are focused on the authorization of payment for goods and services. Other approval criteria are rarely considered, let alone integrated or automated. Nonetheless, it is often desirable to efficiently elicit and consider opinion from one or more designated account managers during a point-of-sale authorization process. For example:

a parent may wish to authorize expenditures above a certain threshold for charges incurred by their progeny while they are away on a trip.
a medium-sized business may wish to enforce a policy requiring at least two company officers to sign off on certain field expenses.

Access to corporate computing infrastructure is tightly controlled for several reasons including:

Regulatory compliance. For example, the Sarbanes-Oxley Act (SOX) of 2002 requires strict controls on access to da; and the Privacy Rule of the Health Insurance Portability and Accountability Act (HIPAA) regulates the use and disclosure of Protected Health Information.
Competitive advantage. Inadvertent exposure of sales da, pending deals, component pricing, proprietary algorithms and source code, etc., would be painfully expensive for many corporations.
Customer trust. Companies that, in the normal course of their business, accumulate vast troves of sensitive customer da, are highly incentivized to guard those da. If they fail to do so adequately, they risk loss of customer trust; steep litigation costs; and they may also face censure from regulatory agencies.

From the perspective of an End User within an enterprise environment, these access control drivers manifest themselves via institutional processes for: expense approval, vacation approval, document access, perimeter controls, purchase order approval, video conferencing access controls, physician phone consultations, and/or medical records access controls.

These types of access approvals are often very complex to implement, and correspondingly inconvenient for End Users. And when controlled access is to be granted to personnel outside of an enterprise, the authentication and auditing requirements are even more onerous and vexing.

Spontaneous Purchase or Service Agreement, which includes but is not limited to executing one-off transactions with a previously unaffiliated vendor or service provider, is often not worth the bother of creating and verifying a new account. Some examples are:

impulse acquisition of goods/services encountered online,
micro-payments, such pay-per-read article dues, and/or online betting.

Controlling Access to Sensitive Data, which includes but is not limited to the following examples:

Automatically approve access to documents for requests originating from specific IP address range, during normal business hours; require explicit approval at other times. This would be an improved access control method over password-protecting individual files, for example.

Tightly control and monitor access to credit history. Today, any vendor, or would-be creditor or employer, can pull an individual's credit history on the basis of a checkbox or clause in a multi-page application or service agreement. Worse, these obscure consents can also legally authorize unknown (to the individual) "partner" organizations to view the history. As a result, the individual is often unaware exactly who accesses their credit report, and when.

Tightly control and monitor access to medical records.

Control access to collaborative editing sessions

Tightly control and monitor access to banking transaction records and account balances. Many accounting, financial planning, and personal finance tools automatically pull da directly from financial institutions, often using the same access credentials used for account login via a web browser.

Provisioning Internet-Connected Devices, which includes but is not limited to the following examples:

configuring auxiliary computing equipment to access email accounts, temporarily accessing a streamed media service account from a set-top box in a hotel room, distinct management of connected devices, including but not limited to, rice cookers, house/home thermostats, irrigation controls, passive solar equipment including window shade devices, heating systems and/or air conditioning.

Parent Control over Content Consumption, which includes but is not limited to:

Parents and legal guardians are responsible for screening and rationing Internet content consumed by their wards (TV shows/movies, music, video games), and also for enforcing spending limits. Ideally, for example, a parent might want their child's content provider to:

Automatically approve purchases below $5.00, up to a monthly maximum of $25. In addition to enforcing spending limits, always report but automatically deny access to X-rated content; automatically approve PG-13 and below content; and trigger supervisor approval for other ratings.

Efficient Delivery and Approval of Relevant Service Offers, which includes but is not limited to the following examples:

targeted advertising based on prior purchases
approval to execute stock trade based on machine-generated recommendation Fine-Grained Access Control to Web Content, which includes but is not limited to requiring certified approval for access to portions of a website.

The preceding embodiments provide examples of the invention and are not meant to constrain the scope of the following claims.

What is claimed is:

1. A method, comprising the step of operating a server as a Certified Approval Service (CAS) provider configured and adapted to communicatively interact with at least one Personal Computing Device (PCD), with said PCD configured and adapted for operation by an end user, further comprising the steps of A1) operating said CAS Provider in response to a contained CAS provider configuration including an entry associated with a CAS Identifier (CAS ID) related to said end user; wherein said entry enables said server to securely communicate with said PCD without said end user engaging said server in an authenticated login session; and A2) authentically operating said PCD by said end user using said CAS ID to securely communicate with said server without said end user engaging said server in said authenticated login session to at least partly create at least one transaction between said end user and a second party through the operation of said CAS provider and said PCD, which involves a patient and/or a studied individual;

A3) wherein said transaction includes at least one of:
A31) a responsibility transaction involving said end user and said second party exercising responsibilities based upon an agreement that said end user and said second party are required to act to improve health or at least attempt not to harm said patient and/or said studied individual;

A32) a critical responsibility transaction between said end user and said patient including said end user directing a repository to supply said patient an item from said repository without said patient's direct interaction, when said patient is very ill;

A33) a control transaction to control at least one device requested by said end user and approved by said second party;

A34) an access transaction approved by said end user to grant access to private data of said patient by said second party;

A35) a supervised transaction requested by said end user and approved by said second party as a supervisor of said end user; and A36) a mercantile transaction requested by said second party to create a payment of at least one of said transaction upon said performance of said transaction for said patient; and A4) wherein said steps and limitations of said method solve at least one member of a technical problems group consisting of: an access to sensitive data, an enterprise infrastructure access, a content access control, a theft of authentication data, a fake request, a fake approval, and a stolen password.

2. The method of 1, further comprising the steps of:
B1) operating said PCD to send a request that said CAS ID be associated with said end user operating said PCD without said end user engaging said server in said authenticated session; and B2) operating said server to implement said entry associated with said CAS ID in response to receiving said request, without engaging in said authenticated session, further comprising the steps of
- C1) operating said server to generate a PCD login authentication as part of said entry, wherein said PCD login authentication cannot engage said end user in said authenticated session with said server;
- C2) operating said server to securely send a CAS device configuration to said PCD without said server engaging said end user in said authenticated session; and
- C3) operating said PCD in response to receiving said CAS device configuration to create said CAS device configuration in said PCD with a PCD login authentication, which cannot engage said end user in said authenticated session with said server.

3. The method of claim 2, further comprising the steps of:
- D1) said server further generating and sending a CAS ID authentication process configuration to said PCD without said server engaging end user in said authenticated session;
- D2) said PCD responding to receipt of said CAS ID authentication process configuration to alter said CAS device configuration to include a CAS ID authentication configuration; and
- D3) wherein said PCD responds to said end user and to said CAS ID authentication configuration to determine at least one authentic interaction associated with said CAS ID.

4. The method of claim 1, comprising the steps of:
- E1) operating said server with said CAS provider configuration including a second entry associated with a second CAS ID and a second PCD login authentication, with said second CAS ID identifying a second end user; wherein said second PCD is adapted and configured for operation by said second end user; wherein said server cannot respond to said second entry by engaging said second end user in a second authenticated session with said server;
- E2) operating said second PCD with a second CAS device configuration including a second CAS ID authentication configuration; and
- E3) operating said second PCD in response to said second end user and in response to said second CAS ID authentication configuration to determine at least one authentic interaction by said second user to create an authentic request for approval by said end user associated with said first CAS ID of a transaction.

5. The method of claim 1, comprising the steps of:
- F1) said second PCD creating and sending a certified approval request of said transaction to said first end user associated with said first CAS ID, without said second end user engaging in a second authenticated session with said server; and
- F2) said server, responding to receipt of said certified approval request and to said second entry, by unpacking said certified approval request to create an unpacked approval request.

6. The method of claim 5, comprising the steps of
- G1) said server, responding to said unpacked approval request and to said entry associated with said CAS ID, to package said unpacked approval request to repackage said certified approval request for transmission to said PCD;
- G2) said server transmitting said certified approval request for said CAS ID to said PCD;
- G3) said PCD responding, to receipt of said certified approval request for said CAS ID, and to said CAS device configuration, to present said certified approval request to said end user; and
- G4) said PCD responding to interactions with said end user, and to said CAS ID authentication configuration, to generate and transmit a certified response to said certified approval request for transmission to said server, without said end user engaging in said authenticated session with said second server.

7. The method of claim 6, comprising the step of
- H1) said server responding to receipt of said certified response from said PCD, and to said entry associated with said CAS ID, to unpack said certified response to create an unpacked certified response.

8. The method of claim 7, comprising the step of:
- J1) said server responding to said unpacked certified response, and to said second entry, to repackage, and securely send, said certified response to said second PCD without said server engaging said second end user in said second login authentication session.

9. The method of claim 8, comprising the steps of:
- K1) said second PCD responding to receipt of said certified response from said server, and to said CAS device configuration, as said second CAS device, to create and present a response notification to said second end user; and
- K2) said second end user responding to said response notification to perform an execution of an approval of said transaction to create an approved transaction.

10. The method of claim 4, wherein said transaction includes at least one of a mercantile transaction, a control transaction, an access transaction, a responsibility transaction and/or a supervised transaction.

11. The method of claim 1, wherein said CAS ID at least partly includes at least one of a user name, a phone number, an email address, a registration number, a membership number, and/or an avatar name.

12. The method of claim 1 implements a convenient and secure solution to at least one of the technical problems, including password management, user authentication data theft, additional verification, point-of-sale authorization, delegated approval, access to sensitive data, content access control, enterprise infrastructure access, automated conditional approval, spontaneous agreement approval, Internet Of Things (IOT) device management, service offer management, delivery offer management.

13. The method of claim 12 implements said convenient and secure solution to said technical problem of said user authentication data theft.

14. The method of claim 1, wherein said personal computing device and/or said server includes at least one instance of at least one of a computer, a finite state machine, an inference engine, a neural network, and/or a quantum computer.

* * * * *